US011671804B2

(12) United States Patent
Cheong et al.

(10) Patent No.: US 11,671,804 B2
(45) Date of Patent: Jun. 6, 2023

(54) ELECTRONIC DEVICE FOR TAKING PRE-ACTION IN BLUETOOTH NETWORK ENVIRONMENT AND METHOD THEREOF

(71) Applicant: Samsung Electronics Co., Ltd., Suwon-si (KR)

(72) Inventors: Gupil Cheong, Suwon-si (KR); Moonseok Kang, Suwon-si (KR); Yunsik Bae, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/897,843

(22) Filed: Jun. 10, 2020

(65) Prior Publication Data

US 2021/0051458 A1 Feb. 18, 2021

(30) Foreign Application Priority Data

Aug. 16, 2019 (KR) ........................ 10-2019-0100431

(51) Int. Cl.
*H04W 88/04* (2009.01)
*H04W 4/80* (2018.01)
(Continued)

(52) U.S. Cl.
CPC .............. *H04W 4/80* (2018.02); *H04W 8/005* (2013.01); *H04W 48/16* (2013.01); *H04W 76/14* (2018.02); *H04W 84/04* (2013.01); *H04W 84/18* (2013.01)

(58) Field of Classification Search
CPC .................................................... H04W 52/46
See application file for complete search history.

(56) References Cited

U.S. PATENT DOCUMENTS 6,901,275 B1\* 5/2005 Aoyagi ................. H04W 84/20
455/574
7,509,417 B1\* 3/2009 Kammer ............... H04W 28/20
370/329
(Continued)

FOREIGN PATENT DOCUMENTS

EP 2 884 775 A1 6/2015
KR 10-0693537 B1 3/2007
(Continued)

OTHER PUBLICATIONS

International Search Report and written opinion dated Sep. 17, 2020, issued in international application No. PCT/KR2020/007533.
(Continued)

*Primary Examiner* — Cindy Trandai
(74) *Attorney, Agent, or Firm* — Jefferson IP Law, LLP

(57) ABSTRACT

An electronic device for taking a pre-action and a method therefor are provided. The electronic device includes a wireless communication circuitry configured to support a Bluetooth protocol and at least one processor operatively connected with the wireless communication circuitry. The at least one processor is configured to establish a first link based on the Bluetooth protocol with a first external electronic device using the wireless communication circuitry, receive a first message for requesting to perform a first pre-action for establishing a second link between the first external electronic device and a second external electronic device from the first external electronic device, using the wireless communication circuitry, perform the first pre-action for establishing the second link with the second external electronic device using the wireless communication circuitry, transmit a second message for reporting a result of the first pre-action to the first external electronic device using the wireless communication circuitry.

18 Claims, 19 Drawing Sheets

(51) Int. Cl.
  *H04W 8/00* (2009.01)
  *H04W 76/14* (2018.01)
  *H04W 84/04* (2009.01)
  *H04W 48/16* (2009.01)
  *H04W 84/18* (2009.01)

(56) References Cited

U.S. PATENT DOCUMENTS

| | | |
|---|---|---|
| 7,995,687 B2 | 8/2011 | Desai et al. |
| 8,347,366 B2 | 1/2013 | Lee |
| 8,768,252 B2 | 7/2014 | Watson et al. |
| 8,942,329 B2 | 1/2015 | Desai et al. |
| 9,020,437 B2 | 4/2015 | Watson et al. |
| 9,258,695 B2 | 2/2016 | Kasslin et al. |
| 9,357,574 B2 | 5/2016 | Lee et al. |
| 9,621,987 B2 | 4/2017 | Watson et al. |
| 9,743,218 B2 | 8/2017 | Chen et al. |
| 9,888,504 B2 | 2/2018 | Lee et al. |
| 10,028,324 B2 | 7/2018 | Kwon et al. |
| 10,104,474 B2 | 10/2018 | Watson et al. |
| 10,631,363 B1* | 4/2020 | Xian .................. H04R 1/1041 |
| 11,140,738 B1* | 10/2021 | Rane .................. H04W 76/19 |
| 2002/0174364 A1* | 11/2002 | Nordman .......... H04L 29/12839 726/15 |
| 2003/0060222 A1* | 3/2003 | Rune .................. H04W 8/005 455/517 |
| 2003/0124979 A1* | 7/2003 | Tanada .................. H04W 84/20 455/41.1 |
| 2003/0195019 A1* | 10/2003 | Litwin .............. H04M 1/72505 455/574 |
| 2004/0142690 A1* | 7/2004 | Eom ................ H04W 36/0072 455/436 |
| 2005/0086273 A1* | 4/2005 | Loebbert ............ H04W 12/069 |
| 2007/0208863 A1* | 9/2007 | Otsuka .............. H04N 1/00222 709/227 |
| 2009/0180519 A1* | 7/2009 | Lee ........................ H04B 1/713 375/E1.001 |
| 2010/0203905 A1* | 8/2010 | Chaubey .............. H04W 68/00 455/458 |
| 2011/0170484 A1* | 7/2011 | Nagai .................. H04W 88/02 370/328 |
| 2012/0058727 A1 | 3/2012 | Cook et al. |
| 2013/0260688 A1 | 10/2013 | Palin et al. |
| 2014/0018068 A1* | 1/2014 | Julian .................. H04W 8/005 455/434 |
| 2014/0181201 A1* | 6/2014 | Choi .................... H04W 8/186 709/204 |
| 2015/0289124 A1* | 10/2015 | Palin ...................... H04W 4/80 455/41.2 |
| 2015/0372746 A1* | 12/2015 | Xie ........................ H04B 7/155 455/11.1 |
| 2015/0373760 A1* | 12/2015 | Palin ...................... H04W 4/80 455/41.2 |
| 2016/0072896 A1* | 3/2016 | Petersen ................ H04L 67/51 709/227 |
| 2016/0157078 A1* | 6/2016 | Palin .................... H04W 8/005 455/41.2 |
| 2016/0174021 A1* | 6/2016 | Lim .................. H04L 47/6275 370/310 |
| 2016/0379105 A1 | 12/2016 | Moore, Jr. et al. |
| 2017/0034646 A1 | 2/2017 | Song |
| 2017/0064755 A1* | 3/2017 | Ha ........................ H04W 76/11 |
| 2018/0007499 A1* | 1/2018 | Lee ...................... H04W 76/10 |
| 2018/0124846 A1* | 5/2018 | Jung .................... H04W 48/14 |
| 2018/0132092 A1* | 5/2018 | Choi .................... H04W 8/005 |
| 2018/0152979 A1 | 5/2018 | Lee et al. |
| 2019/0037312 A1 | 1/2019 | Watson et al. |
| 2019/0253857 A1* | 8/2019 | Li .......................... H04W 4/80 |
| 2019/0335034 A1* | 10/2019 | Dai ...................... H04M 1/72412 |
| 2020/0100077 A1* | 3/2020 | Skaaksrud .......... G06Q 10/0833 |
| 2020/0265288 A1* | 8/2020 | Volkerink ................ B32B 37/12 |
| 2021/0006428 A1* | 1/2021 | Hung .................... H04L 12/12 |
| 2021/0029528 A1* | 1/2021 | Huang .................. H04W 8/005 |
| 2021/0409856 A1* | 12/2021 | Zhu ........................ H04W 4/80 |
| 2022/0060872 A1* | 2/2022 | Liu ...................... H04W 76/10 |

FOREIGN PATENT DOCUMENTS

| | | |
|---|---|---|
| KR | 10-1095412 B1 | 12/2011 |
| KR | 10-1981140 B1 | 5/2019 |
| WO | 2015/182896 A1 | 12/2015 |

OTHER PUBLICATIONS

Indian Office Action dated Apr. 21, 2022; Indian Appln. No. 202217000972.
European Search Report dated May 20, 2022; European Appln No. 20855170.5-1216 / 3970448 PCT/KR2020007533.

* cited by examiner

ELECTRONIC DEVICE FOR TAKING PRE-ACTION IN BLUETOOTH NETWORK ENVIRONMENT AND METHOD THEREOF

CROSS-REFERENCE TO RELATED APPLICATION(S)

This application is based on and claims priority under 35 U.S.C. § 119 of a Korean patent application number 10-2019-0100431, filed on Aug. 16, 2019, in the Korean Intellectual Property Office, the disclosure of which is incorporated by reference herein in its entirety.

BACKGROUND

1. Field

The disclosure relates to an electronic device for taking a pre-action (or referred to as "pre-procedure"). More particularly, the disclosure relates to an electronic device for taking a pre-action for establishing a link in a Bluetooth network environment and a method thereof.

2. Description of Related Art

The Bluetooth standard technology defined by the Bluetooth special interest group (SIG) defines a protocol for short-range wireless communication between electronic devices. In a Bluetooth network environment, electronic devices may transmit or receive data packets, including content such as texts, voices, images, or videos, in a specified frequency band (e.g., about 2.4 gigahertz (GHz)).

For example, user equipment (UE), such as a smartphone, a tablet, a desktop computer, or a laptop computer, may transmit data packets to another UE or an accessory device. The accessory device may include at least one of, for example, an earphone, a headset, a smart watch, a speaker, a mouse, a keyboard, or a display device.

The above information is presented as background information only to assist with an understanding of the disclosure. No determination has been made, and no assertion is made, as to whether any of the above might be applicable as prior art with regard to the disclosure.

SUMMARY

To perform wireless communication over a link based on a Bluetooth protocol, electronic devices may take (or perform) a pre-action for establishing the link. The pre-action may include, for example, an action (e.g., an inquiry scan or Bluetooth low energy (BLE) advertising) for notifying the periphery of its own presence, an action (e.g., an inquiry or a BLE scan) for discovering an external electronic device which is present around the electronic device, an action (e.g., a page) for receiving a request for connection from a specific external electronic device, or an action (e.g., a page or a BLE initiating scan) for requesting the specific external electronic device to connect.

Because electronic devices should transmit or receive signals during a specified time to take a pre-action, power consumption may occur while the pre-action is taken. For example, because an accessory device, such as an earphone or a smart watch, includes a battery of a limited size, the discharging of the battery may occur due to pre-actions.

Furthermore, because wireless communication based on the Bluetooth protocol is performed using limited resources (e.g., a frequency), when two or more actions will be requested in one electronic device, some actions may be ignored or may fail to be normally performed, due to insufficiency of resources. For example, when a pre-action with another external electronic device is requested from a user in a state where a UE is on a call using earphones wirelessly connected, the UE may ignore the request for the pre-action to maintain the call, whereas call quality may be degraded when the UE takes the pre-action.

Aspects of the disclosure are to address at least the above-mentioned problems and/or disadvantages and to provide at least the advantages described below. Accordingly, an aspect of the disclosure is to provide an electronic device for taking a pre-action in a Bluetooth network environment and a method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuitry configured to support a Bluetooth protocol and at least one processor operatively connected with the wireless communication circuitry. The at least one processor may be configured to establish a first link based on the Bluetooth protocol with a first external electronic device, using the wireless communication circuitry, receive a first message for requesting to take a first pre-action for establishing a second link between the first external electronic device and a second external electronic device from the first external electronic device, using the wireless communication circuitry, take the first pre-action for establishing the second link with the second external electronic device using the wireless communication circuitry, and transmit a second message for reporting a result of the first pre-action to the first external electronic device using the wireless communication circuitry.

In accordance with another aspect of the disclosure, an electronic device is provided. The electronic device includes a wireless communication circuitry configured to support a Bluetooth protocol, and at least one processor operatively connected with the wireless communication circuitry. The at least one processor may be configured to establish a first link with a first external electronic device, using the wireless communication circuitry, transmit a first message for requesting to take a pre-action for establishing a second link between the electronic device and the second external electronic device to the first external electronic device, receive a second message for reporting a result of the pre-action from the first external electronic device, and establish the second link with the second external electronic device in response to the second message.

In accordance with another aspect of the disclosure, a method of an electronic device is provided. The method includes establishing a first link based on a Bluetooth protocol with a first external electronic device, receiving a first message for requesting to take a first pre-action for establishing a second link between the first external electronic device and a second external electronic device from the first external electronic device, taking the first pre-action for establishing the second link with the second external electronic device, and transmitting a second message for reporting a result of the first pre-action to the first external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
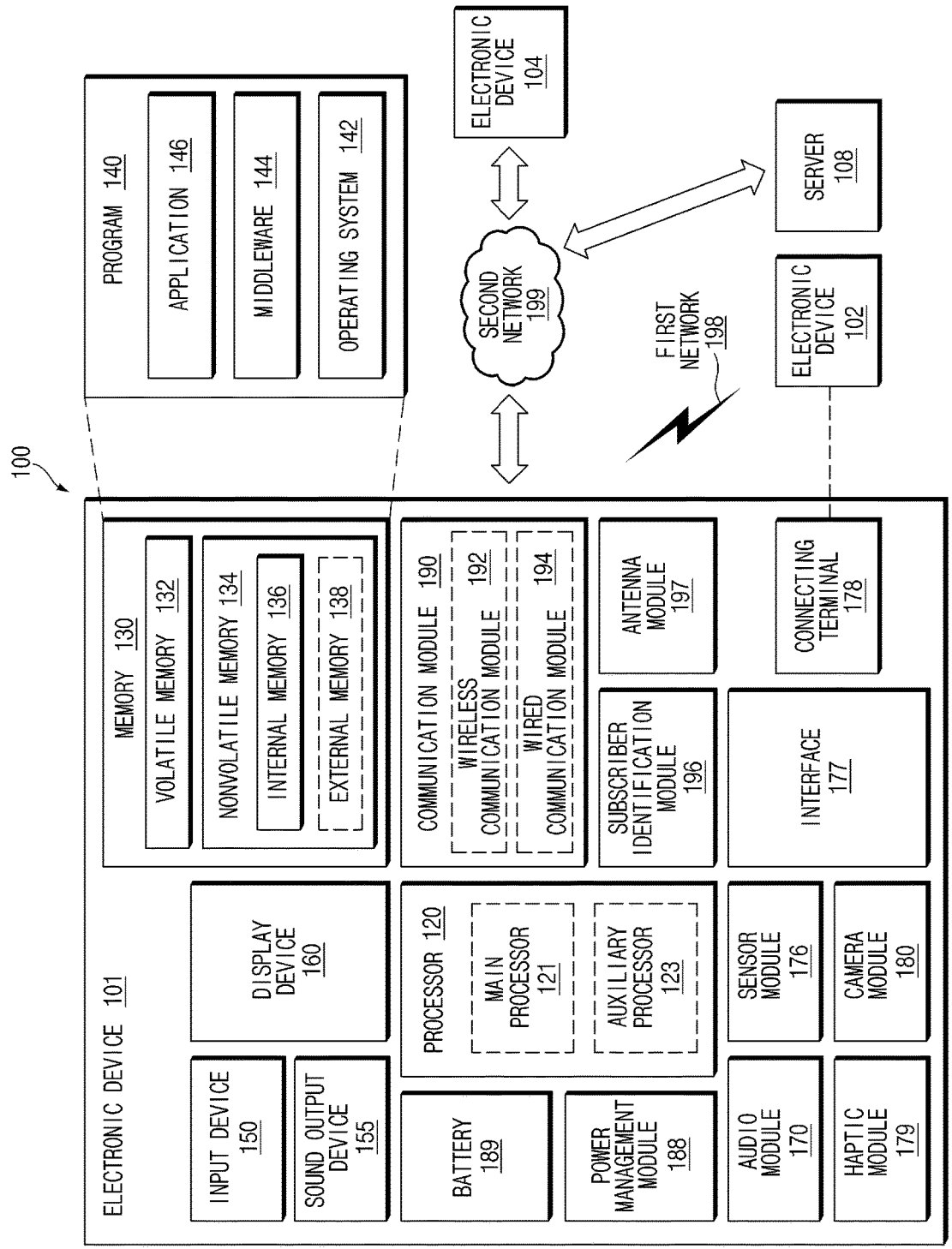
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
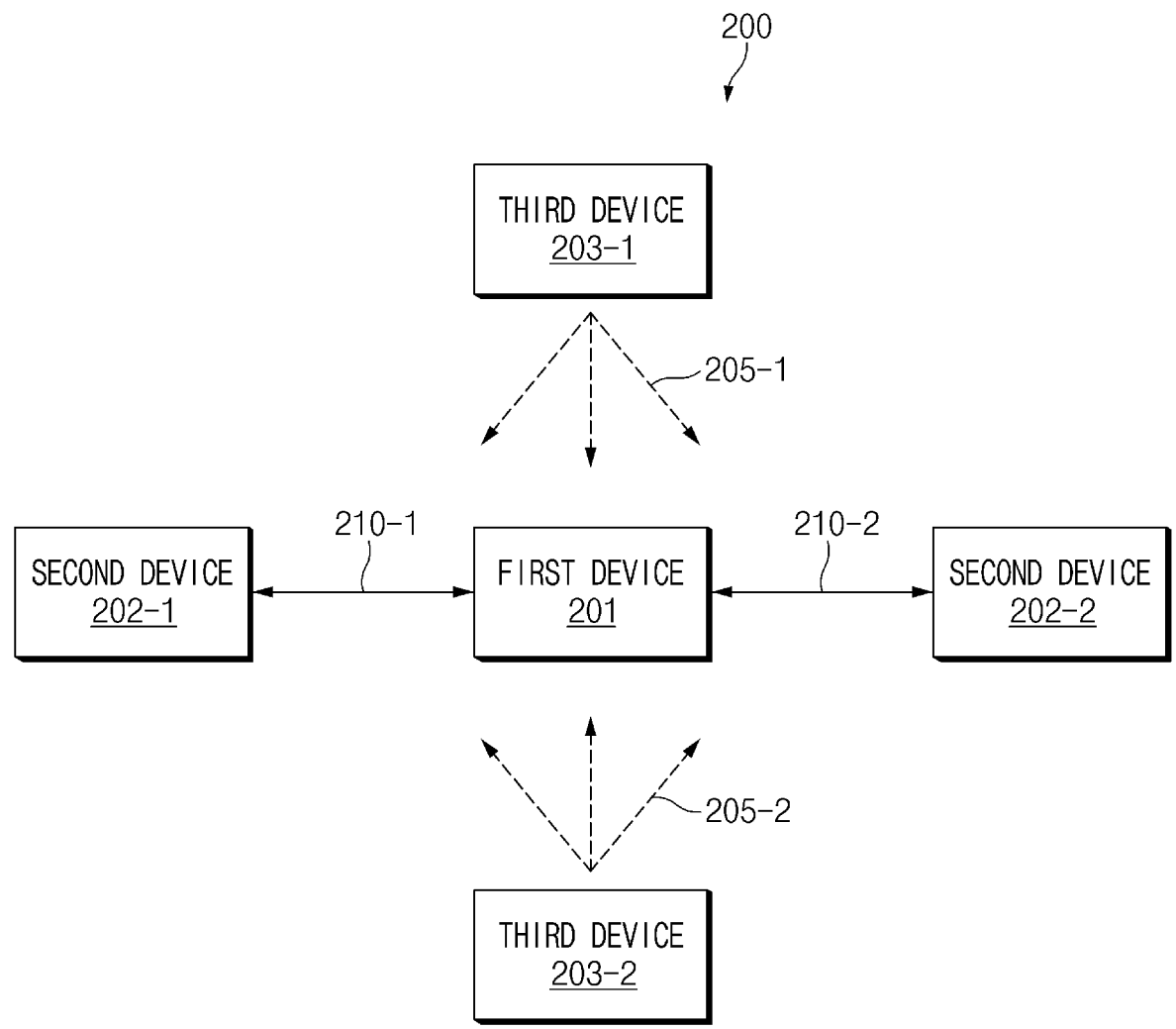
FIG. 2 illustrates a topology indicating a Bluetooth network environment according to an embodiment of the disclosure.

FIG. 2 illustrates a topology 200 indicating a Bluetooth network environment according to an embodiment of the disclosure.

Operations of contents described below may be performed by a hardware configuration (e.g., a processor 120 of FIG. 1, a wireless communication module 192 of FIG. 1, a modem 1710 of FIG. 17, a Bluetooth (BT) circuitry 1730 of FIG. 17, or a second BT circuitry 1740 of FIG. 17) of a first device 201, a second device 202-1 or 202-2, or a third device 203-1 or 203-2 or may be performed by executing instructions stored in a memory (e.g., a memory 130 of FIG. 1).

Referring to FIG. 2, the first device 201, the second devices 202-1 and 202-2, and the third devices 203-1 and 203-2 included in the topology 200 may include components, at least some of which are the same as or similar to an electronic device 101 shown in FIG. 1 and may perform functions, at least some of which are the same as or similar to the electronic device 101. For example, each of the first device 201, the second devices 202-1 and 202-2, and the third devices 203-1 and 203-2 may include user equipment (UE), such as a smartphone, a tablet, a desktop computer, or a laptop computer, or may include an accessory device, such as an earphone, a headset, a smart watch, a speaker, a mouse, a keyboard, or a display device. The number of second devices (e.g., 202-1 and 202-2) or third devices (e.g., 203-1 and 203-2) is not limited to an example shown in FIG. 2.

Each of the first device 201, the second devices 202-1 and 202-2, and the third devices 203-1 and 203-2 may include a wireless communication circuitry (e.g., at least a part of a wireless communication module 192 of FIG. 1) configured to support a Bluetooth protocol defined by the Bluetooth SIG. In this case, the wireless communication circuitry may include at least one of a Bluetooth module or a Bluetooth chip. The Bluetooth protocol may include, for example, a Bluetooth legacy protocol and a Bluetooth low energy (BLE) protocol. The wireless communication circuitry may support one or two of the Bluetooth legacy protocol or the BLE protocol.

The first device 201, the second devices 202-1 and 202-2, or the third devices 203-1 and 203-2 may provide a user with various services by connecting with an external electronic device based on the Bluetooth protocol. For example, when at least one second device (e.g., 202-1 or 202-2) connected with the first device 201 is an accessory device, the first device 201 may provide at least one of a healthcare, handsfree call, media playback, file sharing, or notification function via at least one second device (e.g., 202-1 or 202-2).

Electronic devices (e.g., the first device 201, the second devices 202-1 and 202-2, or the third devices 203-1 and 203-2), each of which supports the Bluetooth protocol, may align timing of transmission or reception of packets on the basis of a clock. The clock based on the Bluetooth protocol may include a reference clock (CLKR), a native clock (CLKN), an estimated clock (CLKE), and a master clock (CLK). The CLKR may be a system clock generated from a system of the electronic device, which may become the standard for other clocks. The CLKN may start from 0x0 with reference to the CLKR at a timing when the wireless communication circuitry (e.g., at least a part of the wireless communication module 192 of FIG. 1) supporting the Bluetooth protocol is powered on. For example, the electronic device may operate the CLKN by applying a time-base-offset to the CLKR. The CLK may be used for synchronization between electronic devices. In this case, a channel resource (e.g., a frequency hopping channel) for transmitting packets may be generated based on a CLKN of a device which plays a master role. In a Bluetooth legacy network, a time resource (e.g., a time slot) may be determined based on a CLKN of a master device. The time slot may be, for example, 625 microsecond (us). A device which plays a slave role may be synchronized by applying an offset to the CLKN of the master device, and the CLKN of the master device may be a CLK.

A device which plays a master role may perform overall control of a physical channel as well as be the standard for determining a CLK. For example, the slave device should receive a packet from the master device to transmit the packet to the master device. In a BLE network, the master device and the slave device may transmit a data packet every specified interval and may respond after a specified time (e.g., the inter frame space (T_IFS), about 150 us), when a data packet is received. For another example, electronic devices may determine a frequency hopping channel based on a clock and a Bluetooth device address (BD_ADDR) of the master device. According to an embodiment, the master role or the slave role may be determined in a procedure of generating a link (e.g., 210-1 or 210-2) between electronic devices (e.g., the first device 201 or the second devices 202-1 and 202-2).

The electronic devices, each of which supports the Bluetooth protocol, may have a unique BD_ADDR. The BD_ADDR may be used in a media access control (MAC) layer. The BD_ADDR may include, for example, 48-bit information. The BD_ADDR may include a lower address part (LAP), an upper address part (UAP), and a non-significant part (NAP). The LAP may indicate a device address specified by a manufacturer, and the UAP and the NAP may indicate device addresses specified to the manufacturer by the institute of electrical and electronics engineers (IEEE). The BD_ADDR may be used for identifying a specific electronic device, determining a frequency hopping channel, authentication, or calculation for link operation.

The electronic devices, each of which supports the Bluetooth protocol, may insert different access codes into a packet on purposes. The access code may include, for example, a device access code (DAC), an inquiry access code (IAC), and a channel access code (CAC). The access code may be generated based on a BD_ADDR of a specific electronic device. The IAC may be used to discover peripheral external electronic devices. The IAC may include a general IAC (GIAC) and a dedicated IAC (DIAC). The GIAC may be generated based on the LAP having a fixed value (e.g., 0x9E8B33), and the DIAC may be generated based on the LAP having a specified range (e.g., from 0x9E8B00 to 0x9E8B3F). The DAC may be used to request a connection. In this case, the DAC may be generated based on an LAP of an electronic device which is requested to connect. The CAC may be used for data communication in a state where two or more electronic devices are connected (e.g., a state where a link (e.g., 210-1 or 210-2) is established). The CAC may be generated based on an LAP of the master device.

The electronic devices, each of which supports the Bluetooth protocol, may take a pre-action for establishing a link (e.g., 210-1 or 210-2). The pre-action may include at least one of, for example, an inquiry scan, a page scan, a BLE scan, a BLE initiating scan, an inquiry, a page, or advertising. When attempting to transmit or receive at least one packet to take a pre-action, power consumption may occur. For example, when the second device 202-1 performs a BLE scan using a duty of 100%, a current of 10 milliampere (mA) or more may be consumed.

According to various embodiments, the second device 202-1 may request the first device 201 to take a pre-action for establishing a link between the second device 202-1 and the third device 203-1. For example, when the second device 202-1 is a device with small battery capacity such as an accessory device, when the remaining capacity of the battery of the second device 202-1 is insufficient, or when a resource available to the second device 202-1 is insufficient, the second device 202-1 may request the first device 201 to take a pre-action to be performed by the second device 202-1, over the link 210-1 between the second device 202-1 and the first device 201. For another example, when the first device 201 includes a hardware structure capable of minimizing current consumed by a pre-action, the second device 202-1 may request the first device 201 to take a pre-action to be performed by the second device 202-1. An embodiment associated with the hardware structure of the first device 201 will be described with reference to FIG. 17.

In embodiments described below, a description will be given of embodiments where the second device 202-1 directly requests the first device 201 to take a pre-action, but, according to other embodiments, the second device 202-1 may request the first device 201 to take a pre-action through another entity. For example, when the second device 202-1 and the first device 201 interwork with each other through the same application or the same account, the second device 202-1 may request the first device 201 to take a pre-action via a server (not shown) interworking with the second device 202-1 and the first device 201.

According to other embodiments, the second device 202-1 may not request the first device 201 separately to take a pre-action, and the first device 201 may take a pre-action for the second device 202-1. For example, when the first device 201 and the second device 202-1 are composed of a set or have a previously connected history, the first device 201 may take a pre-action for the second device 202-1 based on a condition (e.g., at least one of battery remaining capacity, a battery level, or current consumed by a pre-action) associated with the first device 201 although not receiving the request of the second device 202-1.

According to various embodiments, the first device 201 may attempt to receive a signal 205-1 transmitted to the second device 202-1 from the third device 203-1, or may take a pre-action of the second device 202-1 in place of the second device 202-1 by transmitting information (e.g., a DAC) of the second device 202-1 to the third device 203-1. According to an embodiment, the first device 201 may take a pre-action using at least a portion of information of the second device 202-1 or information of the third device 203-1. For example, the first device 201 may use at least one of a BD_ADDR of the second device 202-1, a DAC, a frequency hop synchronization (FHS) packet, an extended inquiry response (EIR) packet, or filter information or may use at least one a BD_ADDR of the third device 203-1 or a DAC.

According to various embodiments, the first device 201 may take pre-actions of the plurality of second devices 202-1 and 202-2. For example, the first device 201 may take a pre-action for establishing a link between the second device 202-2 and the third device 203-2 while (at substantially the same time of) taking a pre-action for establishing a link between the second device 202-1 and the third device 203-1. In this case, the first device 201 may attempt to receive a signal 205-2 transmitted to the second device 202-2 from the third device 203-2 or may transmit information (e.g., a DAC) of the second device 202-2 to the third device 203-2.

Figure 3:
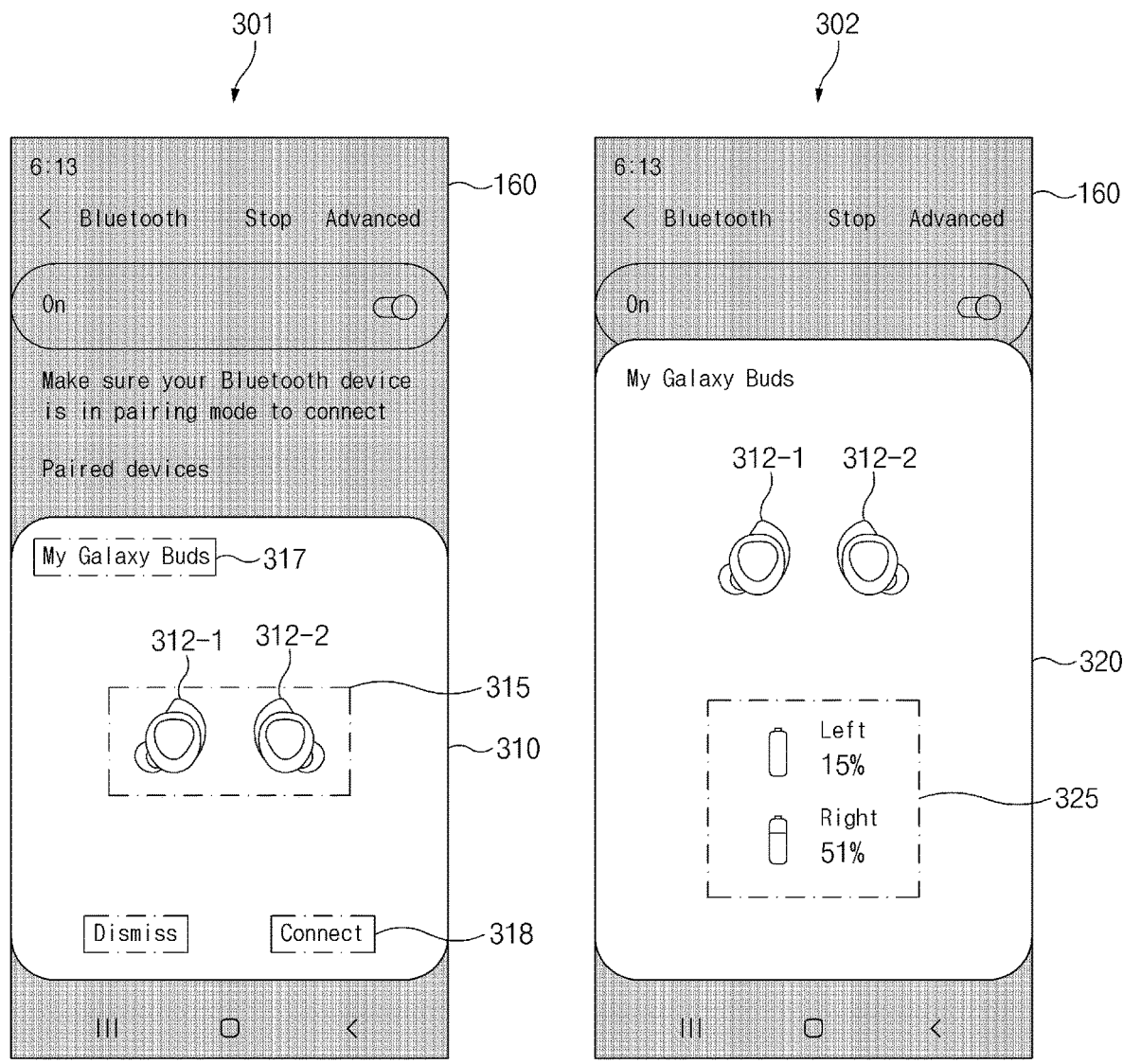
FIG. 3 illustrates a user interface (UI) indicating a connection between devices in a Bluetooth network environment according to an embodiment of the disclosure.

FIG. 3 illustrates a user interface indicating a connection between devices in a Bluetooth network environment according to an embodiment of the disclosure.

FIG. 3 illustrates an embodiment where a plurality of external electronic devices 312-1 and 312-2 (e.g., second devices 202-1 and 202-2 of FIG. 2) are composed of a set for an electronic device (e.g., a first device 201 of FIG. 2), but the same principle is applicable to a user interface indicating only a connection between the electronic device and one external electronic device (e.g., the second device 202-1 of FIG. 2).

Referring to FIG. 3, in reference numeral 301, the electronic device may recognize the first external electronic device 312-1 by receiving an advertising signal transmitted from the first external electronic device 312-1 and may output a first user interface 310 for notifying a user of the recognized first external electronic device 312-1 and the second external electronic device 312-2 constituting a set with the first external electronic device 312-1 on a display device 160 (e.g., a display).

The first user interface 310 may include at least one of, for example, an image 315 indicating shapes of the first external electronic devices 312-1 and the second external electronic device 312-2 or a text 317 indicating a device name (e.g., "My Galaxy Buds") of the first external electronic device 312-1 and the second external electronic device 312-2. For another example, although not illustrated in FIG. 3, the first user interface 310 may indicate whether there is a history where the first external electronic device 312-1 or the second external electronic device 312-2 is previously connected.

According to an embodiment, the advertising signal may include information for a connection (or pairing) between the electronic device and the first external electronic device 312-1. For example, the advertising signal may include at least one of identification information of the first external electronic device 312-1, user account information, current pairing information indicating whether the first external electronic device 312-1 is pairing with another device, a pairing list indicating a list of devices with which the first external electronic device 312-1 is previously paired, simultaneous pairing information indicating a device capable of simultaneously pairing with the first external electronic device 312-1, a transmit power, a sensing region, or battery state information. For another example, when the first external electronic device 312-1 constitutes a set with the second external electronic device 312-2, the advertising signal may further include at least one of identification information of the second external electronic device 312-2, user account information, current pairing information indicating whether the second external electronic device 312-2 is pairing with another device, a pairing list indicating a list of devices with which the second external electronic device 312-2 is previously paired, simultaneous pairing information indicating a device capable of simultaneously pairing with the second external electronic device 312-2, a transmit power, a sensing region, or battery state information.

According to an embodiment, the first external electronic device 312-1 may transmit an advertising signal in a multicast scheme or a broadcast scheme.

According to an embodiment, the first external electronic device 312-1 may transmit an advertising signal depending on a condition for performing advertising. For example, the first external electronic device 312-1 may transmit an advertising signal in response to detecting that cases stored in the first external electronic device 312-1 and the second external electronic device 312-2 are opened. For another example, the first external electronic device 312-1 may transmit an advertising signal in response to receiving power or receiving a user input. For another example, the first external electronic device 312-1 may transmit an advertising signal every specified period.

According to an embodiment, the electronic device may establish a link (e.g., a link 210-1 of FIG. 2) with the first external electronic device 312-1 in response to receiving a user input 318 for requesting to connect with the first external electronic device 312-1 or automatically without a user input. According to an embodiment, the electronic device and the first external electronic device 312-1 may establish a link depending on a procedure based on Bluetooth standards. For example, the electronic device and the first external electronic device 312-1 may perform a baseband page procedure for recognizing a counterpart device, a link manager protocol (LMP) procedure for identifying an LMP version, a clock offset, and a supported function (e.g., a supported feature), a host request/response procedure for identifying a connection, an authentication procedure for identifying whether the counterpart device is a reliable device, an encryption procedure, and a setup complete procedure for notifying a host that the connection (e.g., the establishment of the link) is completed.

When the link is established, as shown in reference numeral 302, the electronic device may output a second user interface 320, indicating that the first external electronic device 312-1 is connected with the electronic device, on the display device 160. The second user interface 320 may further include, for example, an image 325 indicating battery states of the first external electronic device 312-1 and the second external electronic device 312-2 constituting a set with the first external electronic device 312-1. In this case, the electronic device may receive the battery state of the second external electronic device 312-2 from the first external electronic device 312-1 or the second external electronic device 312-2.

Although not illustrated in FIG. 3, according to an embodiment, when the first external electronic device 312-1 is discovered in a state where the electronic device is previously connected with another external device except for the first external electronic device 312-1 and the second external electronic device 312-2, the electronic device may transmit information about a previously connected link to the first external electronic device 312-1 or the second external electronic device 312-2, such that the first external electronic device 312-1 or the second external electronic device 312-2 may monitor the link previously connected between the electronic device and the other external device. In this case, the first user interface 310 may include information indicating that it is able to add the first external electronic 312-1 or the second external electronic device 312-2. When a user input for requesting to add the first external electronic device 312-1 or the second external electronic device 312-2 is received, the electronic device may transmit information about a previously connected link to the first external electronic device 312-1 or the second external electronic device 312-2.

FIG. 3 illustrates an embodiment of outputting a user interface depending on an advertising signal based on a BLE protocol, but, according to other embodiments, the electronic device may output a user interface based on a Bluetooth legacy protocol. For example, the electronic device may receive a frequency hopping synchronization (FHS) packet and an extended inquiry response (EIR) packet from the first external electronic device 312-1 through an inquiry and may output the first user interface 310 based on information included in the FHS packet and the EIR packet. When the user input 318 for requesting the connection is received, the electronic device may establish a link with the first external electronic device 312-1 through a page.

Figure 4:
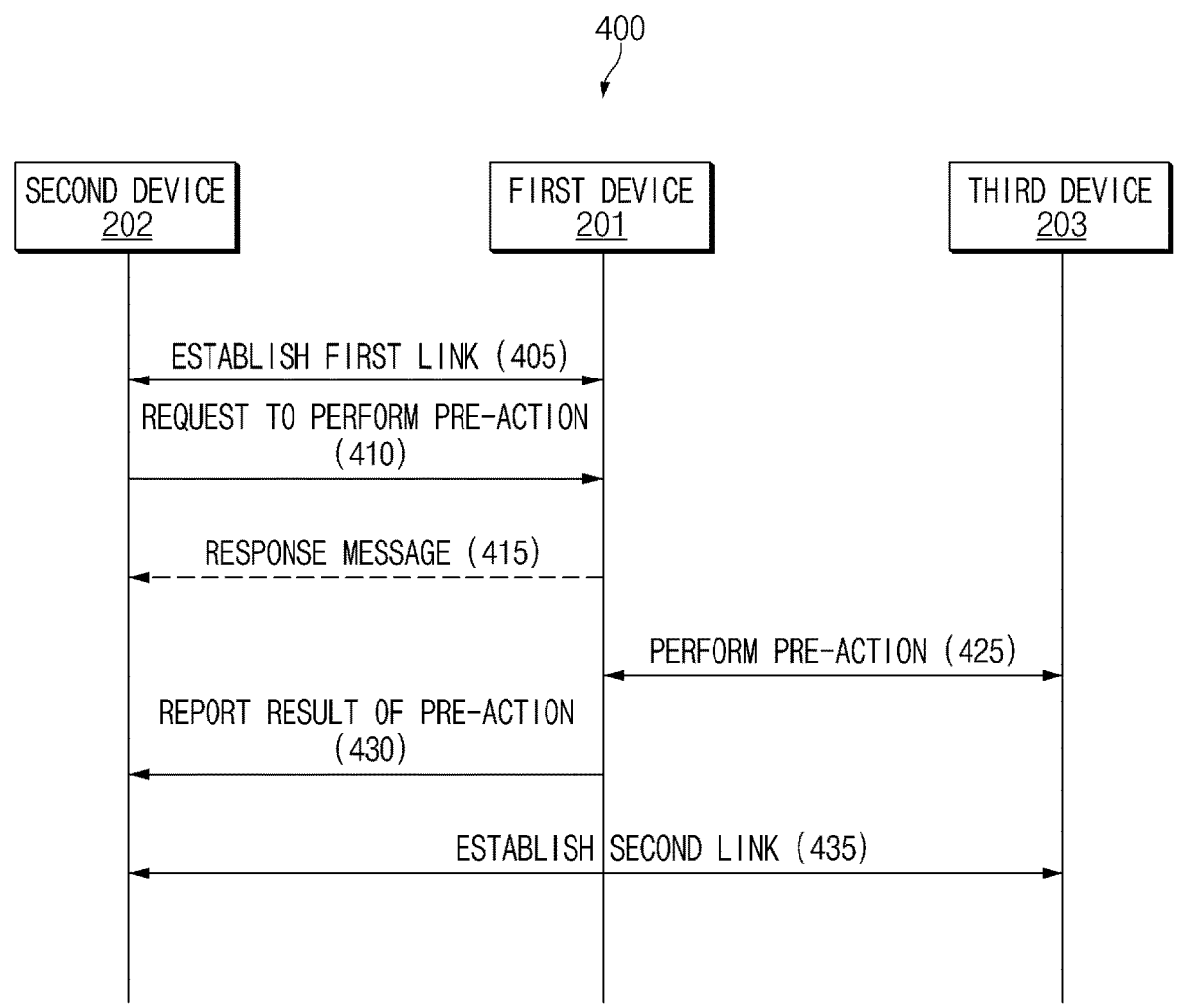
FIG. 4 illustrates a signal sequence diagram for taking a pre-action according to an embodiment of the disclosure.

FIG. 4 illustrates a signal sequence diagram 400 for taking a pre-action according to an embodiment of the disclosure.

Referring to FIG. 4, in operation 405, a first device 201 may establish a first link (e.g., a link 210-1 of FIG. 2) based on a Bluetooth protocol with a second device 202. According to an embodiment, the first device 201 may obtain at least a portion of information of the second device 202 while establishing the first link. For example, the first device 201 may obtain a BD_ADDR of the second device 202.

In operation 410, the second device 202 may transmit a first message, for requesting to take a pre-action for establishing a second link between the second device 202 and an external electronic device (e.g., the third device 203), to the first device 201. For example, the second device 202 may transmit the first message to the first device 201 based on a Bluetooth protocol (e.g., a Bluetooth legacy or BLE protocol) or another short-range communication protocol. For another example, the second device 202 may transmit the first message through a field or a data payload defined in the Bluetooth protocol. According to an embodiment, the second device 202 may insert or may fail to insert information of the second device 202 into the first message depending on a type of a pre-action requested by the second device 202. For example, when requesting to perform a BLE scan, the second device 202 may insert filter information into the first message. For another example, when the second device 202 requests to perform an inquiry, because the first device 201 transmits only an identification (ID) packet including a GIAC, the second device 202 may fail to insert information necessary to take a pre-action into the first message.

According to an embodiment, the second device 202 may identify whether it is possible for the first device 201 to take a pre-action before transmitting the first message. For example, the second device 202 may identify whether it is possible for the first device 201 to take a pre-action, based on at least one of feature information (e.g., a supported feature) of the first device 201, which is shared while establishing the first link, information included in an EIR packet of the first device 201, version information of the first device 201, or additional message exchange.

According to an embodiment, when it is possible for the first device 201 to select whether to take a pre-action of the second device 202 based on a specified condition, the second device 202 may insert at least one of information for determining the specified condition into the first message. The information for determining the specified condition may include, for example, at least one of information included in Table 1 below.

TABLE 1

| Total Battery | Current Battery | Scan consumption | ANT resource |
|---|---|---|---|
| 0x10 0E | 0xB0 04 | 0x0A 00<br>0x14 00<br>0x0F 00 | 0x32 |

In Table 1 above, the 'Total Battery' may refer to the battery level of the second device 202, the 'Current Battery' may refer to the remaining capacity of the battery of the second device 202, the 'Scan consumption' may refer to current consumption required for a pre-action (e.g., scan), and the 'ANT resource' may refer to antenna (ANT) resource information of the specified frequency (e.g., 2.4 Ghz) in the Bluetooth protocol. Other than the information included in Table 1 above, the information for determining the specified condition may further include at least one of a type (or class) or a capability of the second device 202.

According to another embodiment, the second device 202 may fail to insert the information for determining the specified condition into the first message. For example, because it is possible for the first device 201 to obtain the information included in Table 1 above or a type of the second device 202 through information (e.g., a supported feature or manufacturer data) obtained in the process of establishing the first link, the second device 202 may fail to insert the information for determining the specified condition into the first message. According to another embodiment, when the first device 201 and the second device 202 are composed of a set or when the first device 201 is configured to take a pre-action without regard to the specified condition, the second device 202 may fail to insert the information for determining the specified condition into the first message.

According to another embodiment, the first device 201 and the second device 202 are composed of a set, the second device 202 may fail to perform operation 410. In this case, the first device 201 may perform operation 425 although not receiving the first message based on a condition (e.g., at least one of the remaining capacity of the battery, a battery level, or current consumed by a pre-action) associated with the first device 201. According to an embodiment, when the first device 201 and the second device 202 are composed of a set, a device which takes a pre-action with an external electronic device (e.g., the third device 203) and a device which establishes a link (e.g., the second link 210-2) with the external electronic device (e.g., the third device 203) may be set. For example, a device which takes a charge of a master role of a link (e.g., the first link 210-1) between the first device 201 and the second device 202 may be set to a device which establishes the link.

According to an embodiment, when the first device 201 receives a request to take a pre-action of the second device 202, in operation 415, the first device 201 may transmit a response message to the first message to the second device 202. In this case, the first device 201 may transmit a response message for accepting the request of the pre-action when the specified condition is satisfied and may transmit a response message for rejecting the request of the pre-action when the specified condition is not satisfied. According to another embodiment, when not selecting whether to take a pre-action of the second device 202, the first device 201 may fail to perform operation 415.

Although not illustrated in FIG. 4, after transmitting the first message or after receiving the response message indicating the acceptance from the first device 201, the second device 202 may not take a pre-action requested to the first device 201 any longer.

In operation 425, the first device may take a pre-action with the third device 203. According to an embodiment, the first device 201 may perform an inquiry, an inquiry scan, BLE advertising, a BLE scan, a page, or a BLE initiating scan for the second device 202. For example, the first device 201 may receive a packet (e.g., an ID packet or an advertising packet) transmitted from the third device 203 or may transmit a packet to the third device 203. According to an embodiment, the first device 201 may adjust a duty based on a resource required to take a pre-action. An embodiment of adjusting a duty will be described with reference to FIG. 14.

In operation 430, the first device 201 may transmit a second message, for reporting a result of the pre-action, to the second device 202 over the first link. According to various embodiments, when the pre-action includes a plurality of actions, the first device 201 may transmit the second message whenever a separate operation is completed and may transmit the second message when all the plurality of operations are completed.

According to other embodiments, the first device 201 may fail to report a result of the pre-action to the second device 202. For example, when the second device 202 requests the first device 201 to perform an inquiry scan, the first device 201 may transmit an FHS packet and an EIR packet of the second device 202 to an external electronic device (e.g., the third device 203), which performs an inquiry, without reporting reception of an ID packet to the second device 202.

In operation 435, the second device 202 may establish a second link between the second device 202 and the third device 203 based at least in part on the received second message.

Through the above-mentioned method, the second device 202 may reduce consumption of current and a resource required for a pre-action. Embodiments of FIGS. 5, 6, 7A and 7B, 8A and 8B, 9 to 11 described below will be described with reference to an example where some operations are embodied, added, or omitted in the embodiment of FIG. 4.

Figure 5:
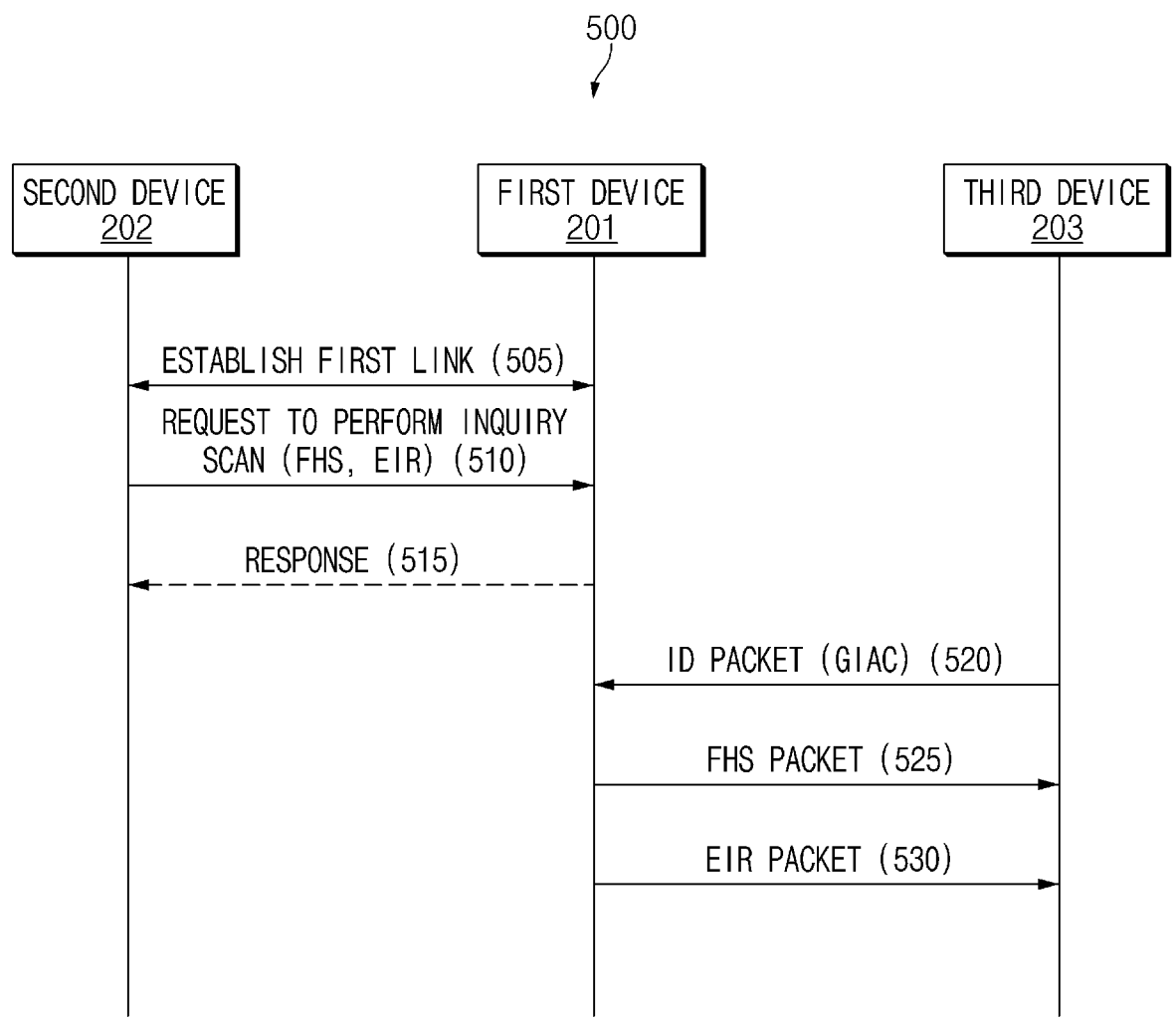
FIG. 5 illustrates a signal sequence diagram for performing an inquiry scan according to an embodiment of the disclosure.

FIG. 5 illustrates a signal sequence diagram 500 for performing an inquiry scan according to an embodiment of the disclosure.

Electronic device, each of which supports a Bluetooth legacy protocol, may discover an external electronic device which is present around them through an inquiry or may notify the external electronic device of their presence. For example, the electronic device which performs an inquiry may transmit an ID packet including a GIAC every specified period (e.g., two times per one time slot). An external electronic device which performs an inquiry scan may receive the ID packet and may transmit an FHS packet and an EIR packet to the electronic device which transmits the ID packet (i.e., the electronic device which performs the inquiry).

The FHS packet and the EIR packet may include information necessary to notify a user of an external electronic device discovered through the inquiry by the electronic device which performs the inquiry (e.g., information for constituting a first user interface 310 of FIG. 3) and information necessary to establish a link. For example, the FHS packet may include at least one of a BD_ADDR of an electronic device which performs an inquiry scan, a class of device (COD), a UAP, an NAP, or an LAP. The COD may indicate a class (e.g., an earphone, a headset, a wearable device, a speaker, a mouse, a keyboard, or a display device) of an electronic device which performs an inquiry scan. The EIR packet may include at least one of, for example, a device name of an electronic device which performs an inquiry scan, a Tx power level, or a manufacturer's name.

Referring to FIG. 5, in operation 505 (e.g., operation 405 of FIG. 4), a first device 201 may establish a first link (e.g., a link 210-1 of FIG. 2) based on a Bluetooth protocol with a second device 202.

In operation 510, the second device 202 may transmit a message for requesting to perform an inquiry scan to the first device 201. According to an embodiment, the second device 202 may transmit at least one of an FHS packet or an EIR packet of the second device 202 together with the message. According to another embodiment, the second device 202 may transmit only a portion of information included in the FHS packet or the EIR packet together with the message. According to another embodiment, when the first device 201 obtains at least one of the FHS packet or the EIR packet of the second device 202 in the process of establishing the first link, the second device 202 may fail to transmit the FHS packet and the EIR packet. According to an embodiment, the second device 202 may further insert the information included in Table 1 above into the message. For another example, when the first device 201 and the second device 202 are composed of a set, the second device 202 may fail to perform operation 510.

According to an embodiment, the first device 201 may transmit a response message for responding to receiving the message for requesting to perform the inquiry scan to the second device 202 (operation 515) or may perform operation 520 without transmitting the response message.

The first device 201 may receive an ID packet including a GIAC from a third device 203 in operation 520 by attempting to receive an ID packet at a specified period (e.g., for 11.25 ms per 1.28 s).

In response to receiving the ID packet from the third device 203, in operation 525, the first device 201 may transmit the FHS packet of the second device 202 to the third device 203. After transmitting the FHS packet, in operation 530, the first device 201 may transmit the EIR packet to the third device 203.

FIG. 5 illustrates an embodiment where the first device 201 performs the transmission of the FHS packet and the transmission of the EIR packet, but, according to other embodiments, the first device 201 may only receive the ID packet, and the second device 202 may directly transmit the FHS packet or the EIR packet to the third device 203. In this case, after operation 520, the first device 201 may notify the second device 202 that the ID packet is received from the third device 203.

Figure 6:
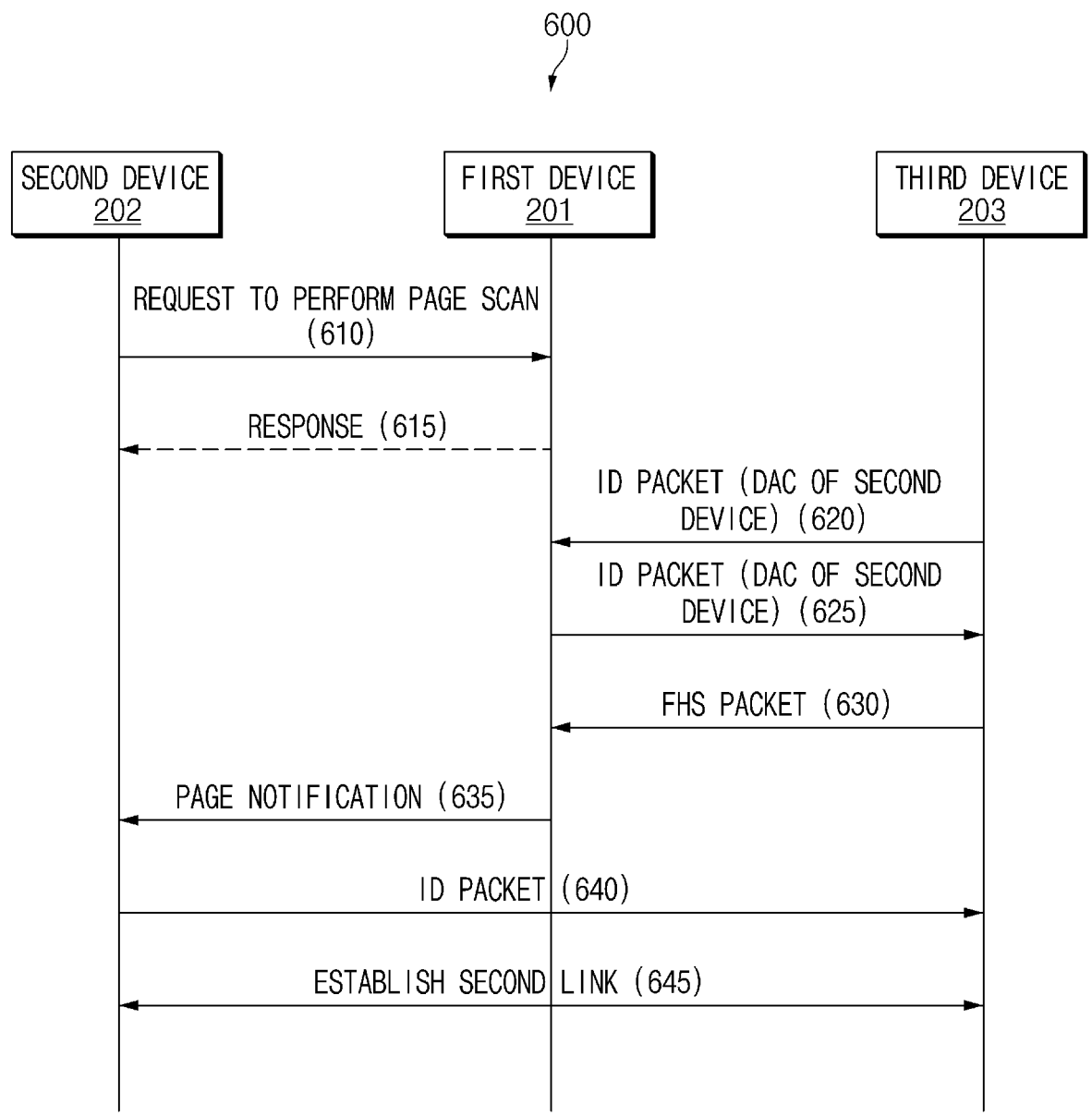
FIG. 6 illustrates a signal sequence diagram for performing a page scan according to an embodiment of the disclosure.

FIG. 6 illustrates a signal sequence diagram 600 for performing a page scan according to an embodiment of the disclosure.

Operations 610 to 625 may be performed after the operations of the signal sequence diagram 500 of FIG. 5.

Electronic devices, each of which supports a Bluetooth legacy protocol, may perform a page and a page scan to establish a link based on the Bluetooth protocol (or connect) with an external electronic device discovered through an inquiry. A device which requests a connection may be referred to as a page device, and a device which is requested to connect may be referred to a page scan device. The page device may generate a DAC using a BD_ADDR of the page scan device and may transmit an ID packet including the DAC during a specified time (e.g., 1.28 s*4 or 1.28 s*5). For example, the page device may transmit an ID packet every certain period until connection is completed or until there is a response. The page scan device may attempt to receive an ID packet at a specified period (e.g., for 11.25 ms per 1.28 s). The page device and the page scan device may transmit and receive an ID packet while hopping a frequency channel using a BD_ADDR of the page scan device. When the ID packet is received, the page scan device may transmit the same ID packet as the received ID packet to the page device.

When the ID packet is received from the page scan device, the page device may transmit an FHS packet including a BD_ADDR, clock information, and a logical transport (LT) address of the page device to the page scan device. The page scan device may transmit an ID packet to the page device to notify the page device that the FHS packet of the page device is received. When the ID packet is transmitted, a link between the page device and the page scan device may be established. When the link is established, the page device and the page scan device may transmit or receive a packet by hopping a frequency channel using the BD_ADDR of the page device.

Referring to FIG. 6, in operation 610, a second device 202 may transmit a message for requesting to perform a page scan to a first device 201 over a first link (e.g., a link 210-1 of FIG. 2). According to an embodiment, the second device 202 may insert information, indicating whether the first device 201 reports a BD_ADDR of a page device (e.g., a third device 203) to the second device 202, into the message. When the first device 201 reports the BD_ADDR of the page device, the second device 202 may transmit an ID packet to the page device using the BD_ADDR of the page device. According to an embodiment, the second device 202 may further insert the information included in Table 1 above into the message. For another example, when the first device 201 and the second device 202 are composed of a set, the second device 202 may fail to perform operation 610.

According to an embodiment, the first device 201 may transmit a response message for responding to receiving the message for requesting to perform the page scan to the second device 202 (operation 615) or may perform operation 620 without transmitting the response message.

In operation 620, the first device 201 may attempt to receive an ID packet while hopping a frequency channel using the BD_ADDR of the second device 202. The third device 203, which performs a page, may transmit an ID packet including a DAC of the second device 202 to attempt to request a connection. As the second device 202 transmits the ID packet and as the first device 201 attempts to receive the ID packet, the first device 201 may receive the ID packet from the third device 203.

In operation 625, the first device 201 may transmit an ID packet including the DAC of the second device 202 to the third device 203.

In operation 630, the third device 203 may transmit an FHS packet of the third device 203 in response to receiving the ID packet. The first device 201 may receive the FHS packet transmitted from the third device 203.

In operation 635, the first device 201 may transmit a page notification message to the second device 202 over the first link. According to an embodiment, the first device 201 may transmit the FHS packet of the third device 203 together with the page notification message.

In operation 640, the second device 202 may transmit an ID packet, indicating that the FHS packet of the third device 203 is normally received, to the third device 203. When the third device 203 receives the ID packet from the second device 202, in operation 645, a second link between the second device 202 and the third device 203 may be established.

FIG. 6 illustrates an embodiment where the first device 201 transmits the page notification message to the second device 202 after receiving the FHS packet of the third device 203, but, according to other embodiments, the first device 201 may transmit the page notification message to the second device 202 after receiving the ID packet from the third device 203 (e.g., after operation 620). In this case, the second device 202 may directly perform an operation after operation 625. According to other embodiments, the first device 201 may transmit an ID packet responding to the FHS packet of the third device 203 (e.g., operation 640) and may transmit a page notification message to the second device 202.

Figure 7A:
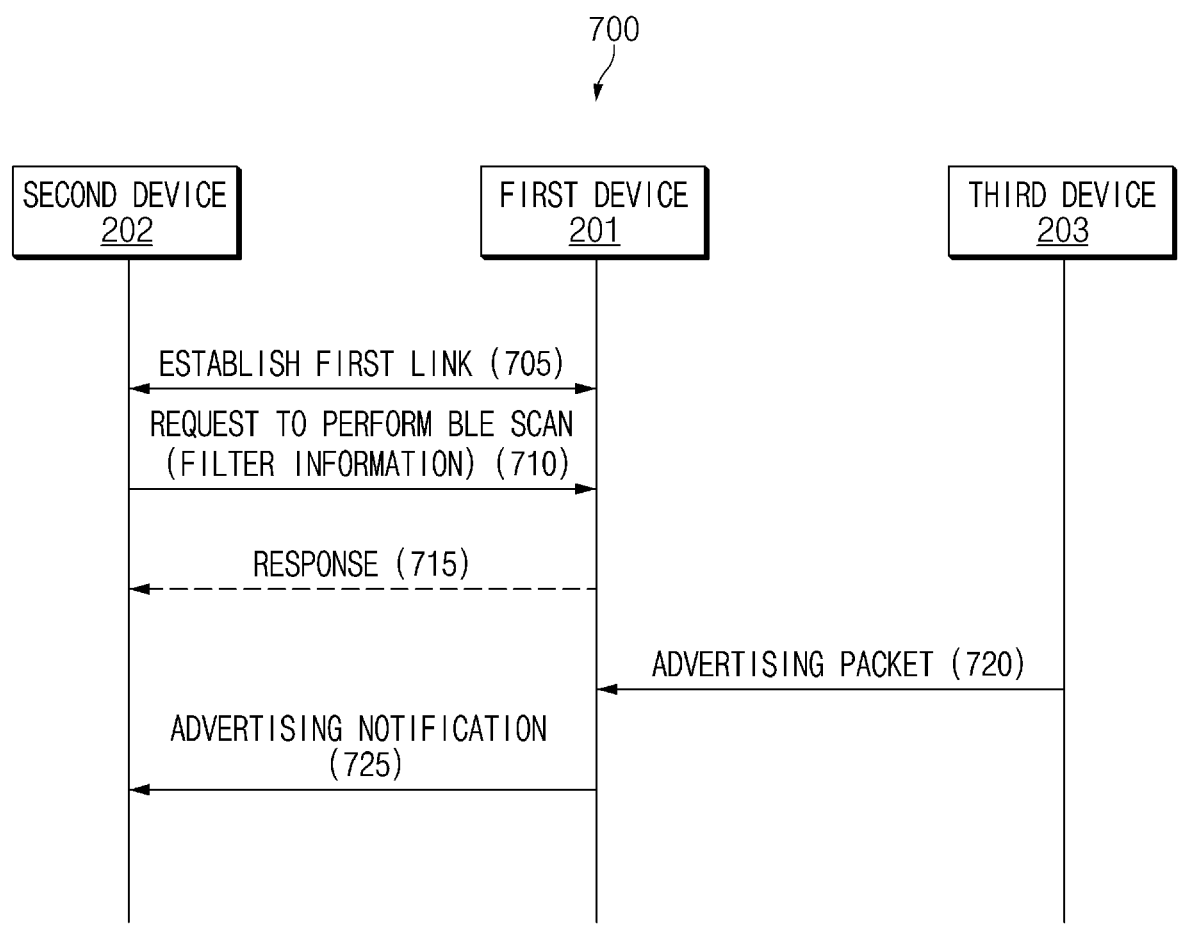
FIG. 7A illustrates a signal sequence diagram for performing a BLE scan according to an embodiment of the disclosure.
Figure 7B:
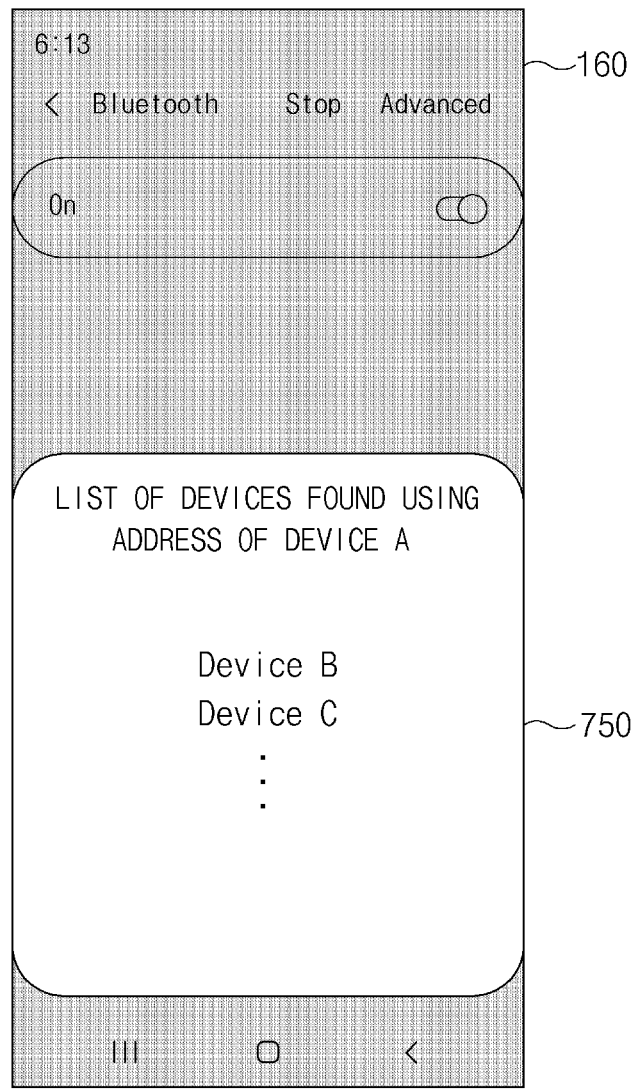
FIG. 7B illustrates a user interface indicating a list of devices found using an address of a second device according to an embodiment of the disclosure.

FIGS. 7A and 7B illustrate an operation of performing a BLE scan according to various embodiments of the disclosure.

FIG. 7A illustrates a signal sequence diagram 700 for performing a BLE scan. FIG. 7B illustrates a user interface 750 indicating a list of devices found using an address of a second device 202.

Electronic devices, each of which supports a BLE protocol, may perform a BLE scan to search for an external electronic device which is present around them. For example, a plurality of external electronic devices may transmit an advertising packet every specified period, and the electronic device may attempt to connect with the external electronic device which transmits the advertising packet suitable for filter information. The filter information may be specified by, for example, a manufacturer.

Referring to FIG. 7A, in operation 705 (e.g., operation 405 of FIG. 2), a first device 201 may establish a first link (e.g., a link 210-1 of FIG. 2) based on a Bluetooth protocol with a second device 202.

In operation 710, the second device 202 may transmit a message for requesting to perform a BLE scan to the first device 201. According to an embodiment, the second device 202 may insert filter information into the message. According to an embodiment, the second device 202 may further insert the information included in Table 1 above into the message. For another example, when the first device 201 and the second device 202 are composed of a set, the second device 202 may fail to perform operation 710.

According to an embodiment, the first device 201 may transmit a response message for responding to receiving the message for requesting to perform the BLE scan to the second device 202 (operation 715) or may perform operation 720 without transmitting the response message.

In operation 720, the first device 201 may receive an advertising packet from the third device 203. When device information of the third device 203, included in the advertising packet, is matched with the filter information, in operation 725, the first device 201 may transmit an advertising notification message to the second device 202.

According to various embodiments, the first device 201 may notify a user of a result of the BLE scan of the second device 202. For example, referring to FIG. 7B, the first device 201 may output a user interface 750 indicating a list of external devices (e.g., the third device 203, or 'Device B' and 'Device C') found using an address of the second device 202 (e.g., 'Device A') on a display device 160 (e.g., a display). FIG. 7B illustrates only an embodiment indicating only device names of the found external devices, but, according to other embodiments, the first device 201 may output an image of the found external device on the display device 160 as shown in FIG. 3.

Figure 8A:
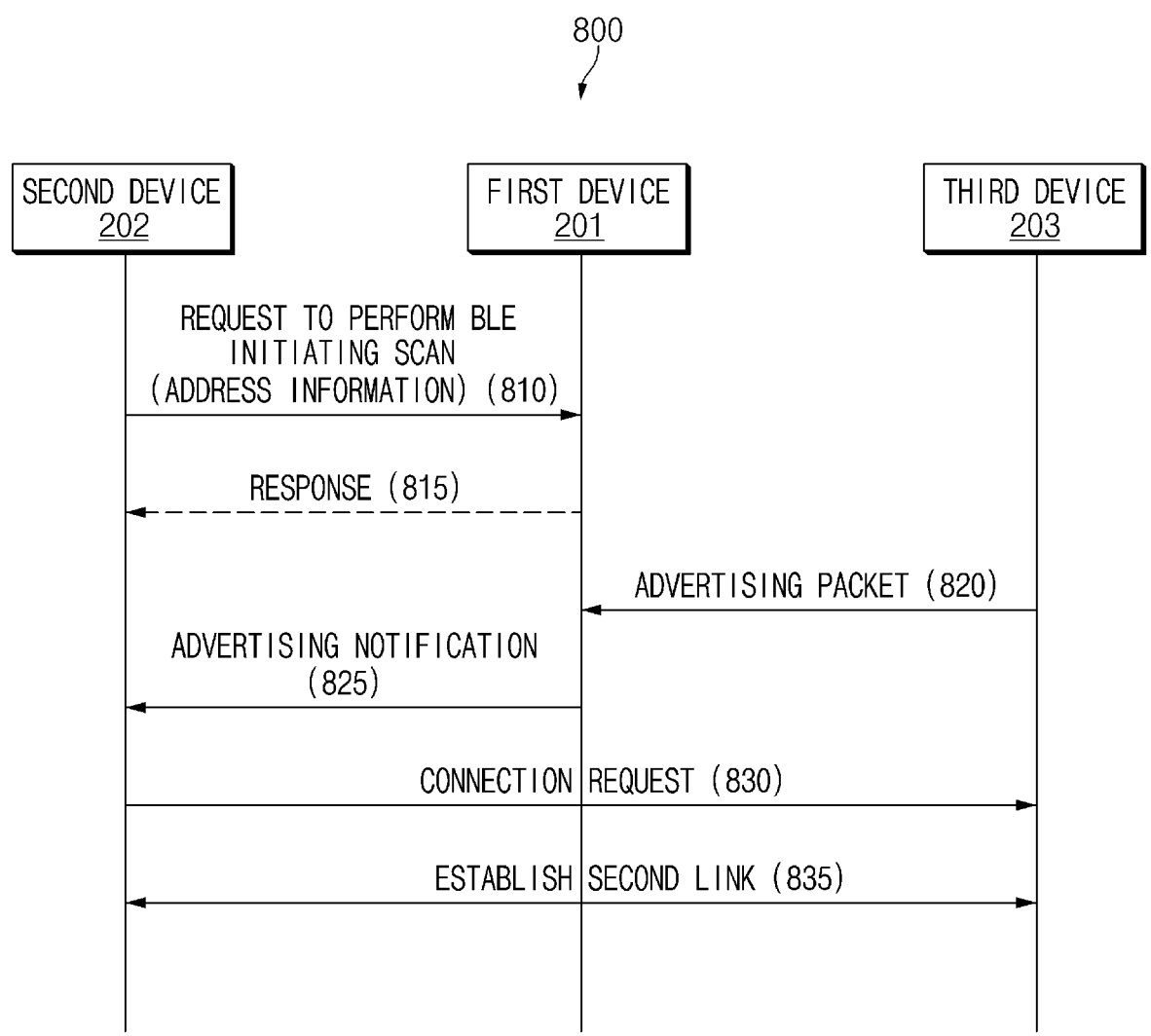
FIG. 8A illustrates a signal sequence diagram for performing a BLE initiating scan according to an embodiment of the disclosure.
Figure 8B:
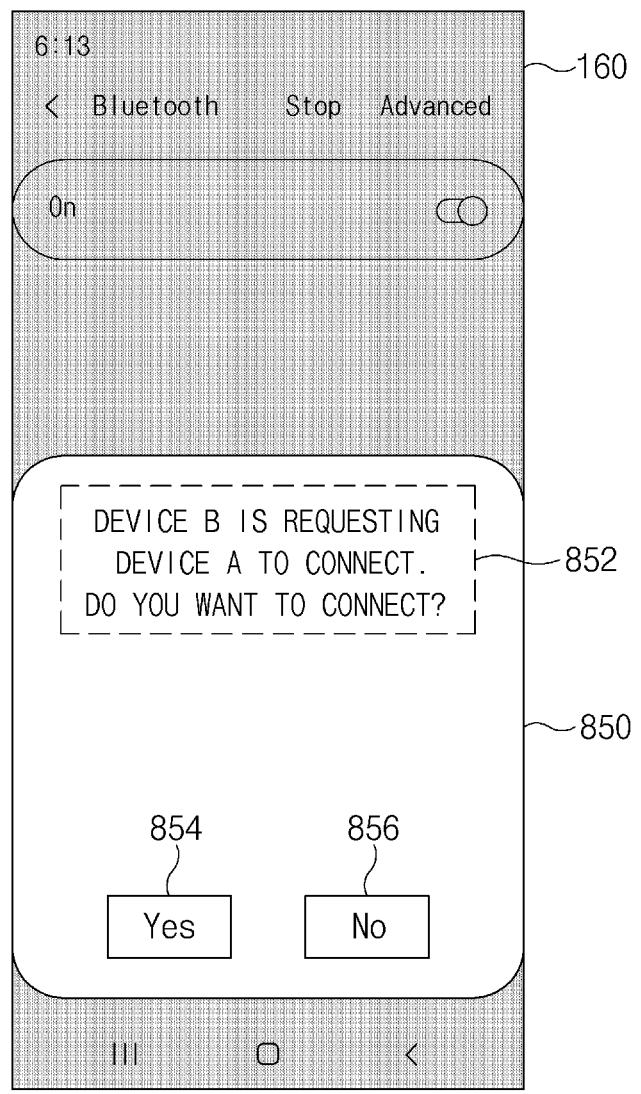
FIG. 8B illustrates a user interface for querying about establishing a link of a second device according to an embodiment of the disclosure.

FIGS. 8A and 8B illustrate an operation of performing a BLE initiating scan according to various embodiments of the disclosure. FIG. 8A illustrates a signal sequence diagram 800 for performing a BLE initiating scan. FIG. 8B illustrates a user interface 850 for querying about establishing a link of a second device.

Referring to FIG. 8A, operations 810 to 835 may be performed after the operations of the signal sequence diagram 700 of FIG. 7A. In operation 810, a second device 202 may transmit a message for requesting to perform a BLE initiating scan to a first device 201 over a first link (e.g., a link 210-1 of FIG. 2). According to an embodiment, the second device 202 may insert address information (e.g., BD_ADDR) of a device (e.g., a third device 203) the second device 202 wants to connect into the message. According to an embodiment, the second device 202 may further insert the information included in Table 1 above into the message. For another example, when the first device 201 and the second device 202 are composed of a set, the second device 202 may fail to perform operation 810.

According to an embodiment, the first device 201 may transmit a response message for responding to receiving the message for requesting to perform the BLE initiating scan to the second device 202 (operation 815) or may perform operation 820 without transmitting the response message.

In operation 820, the first device 201 may receive an advertising packet from the third device 203. The advertising packet transmitted in operation 820 may include at least one of, for example, manufacturer information, a device name, or an access address of the third device 203. The access address may be used in a link layer for a connection (or link establishment) between electronic devices.

In operation 825, the first device 201 may transmit an advertising notification message to the second device 202 to notify the second device 202 that the advertising packet is received over the first link. According to an embodiment, the first device 201 may transmit at least one of manufacturer information, a device name, or an access address of the third device 203 together with the advertising notification message.

According to an embodiment, in response to receiving the advertising packet from the third device 203, the first device 201 may query the user about establishment of a second link between the second device 202 and the third device 203 before performing operation 825. For example, referring to FIG. 8B, the first device 201 may output a user interface 850, for querying about the establishment of the second link between the second device 202 and the third device 203, on a display device 160. The user interface 850 may include, for example, a text 852 (e.g., 'Device B is requesting Device A to connect. Do you want to connect?') for querying whether to accept a connection between the third device 203 (e.g., 'Device B') and the second device 202 (e.g., 'Device A') and objects 854 and 856 capable of receiving a user input for accepting or rejecting the connection. When the user input for accepting the connection is received, in operation 825, the first device 201 may transmit an advertising notification to the second device 202.

In operation 830, the second device 202 may transmit a connection request message including an access address of the third device 203 to the third device 203. When the third device 203 receives the connection request message, in operation 835, the second link between the second device 202 and the third device 203 may be established. According to an embodiment, the first device 201 may output information, indicating that the second link between the second device 202 and the third device 203 is established, on the display device 160 (e.g., the display).

Figure 9:
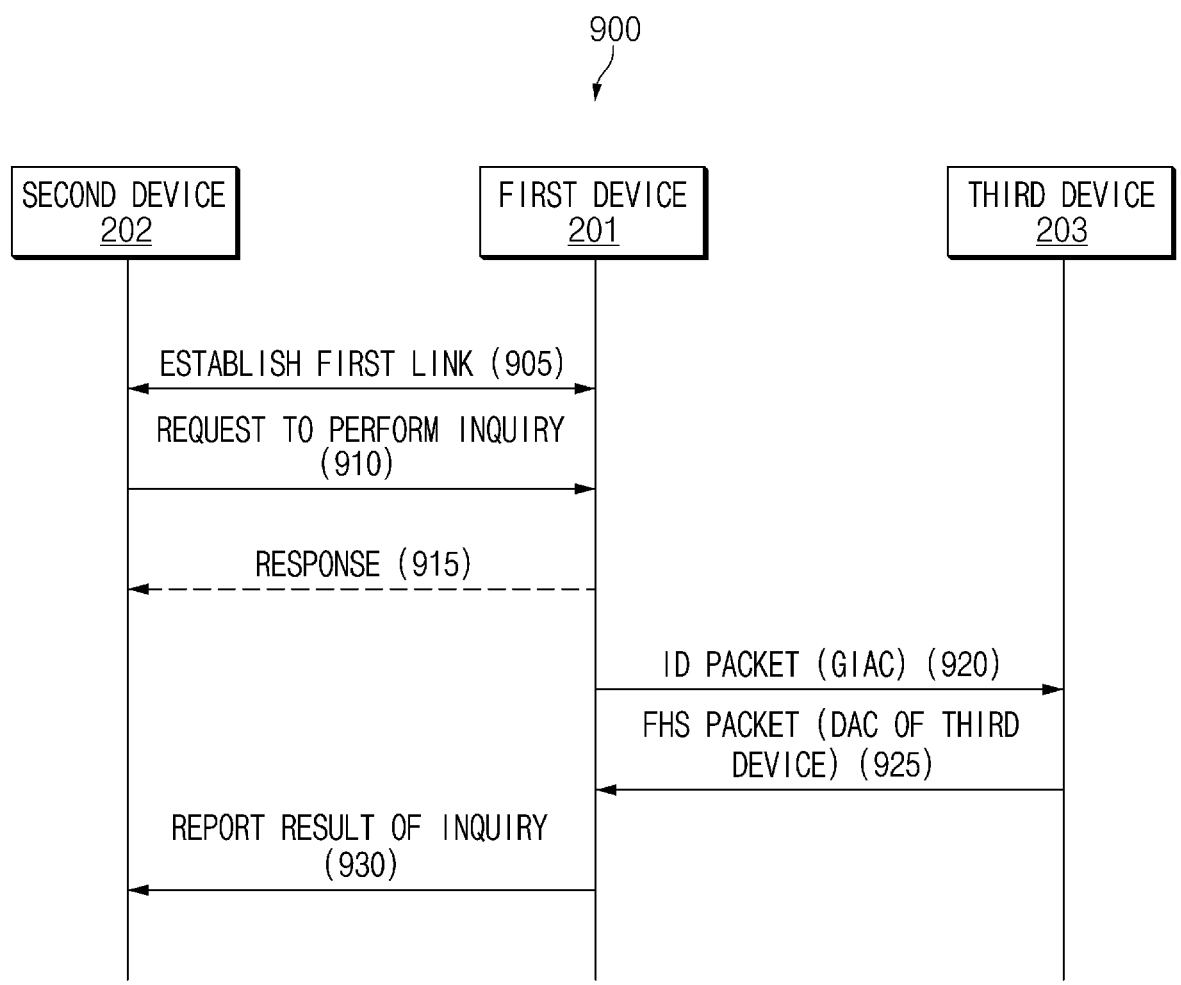
FIG. 9 illustrates a signal sequence diagram for performing inquiry according to an embodiment of the disclosure.

FIG. 9 illustrates a signal sequence diagram 900 for performing an inquiry according to an embodiment of the disclosure.

Referring to FIG. 9, in operation 905 (e.g., operation 405 of FIG. 4), a first device 201 may establish a first link (e.g., a link 210-1 of FIG. 2) based on a Bluetooth protocol with a second device 202.

In operation 910, the second device 202 may transmit a message for requesting to perform an inquiry to the first device 201. For another example, when the first device 201 and the second device 202 are composed of a set, the second device 202 may fail to perform operation 910. According to an embodiment, the second device 202 may further insert the information included in Table 1 above into the message. The first device 201 may transmit a response message for responding to receiving the message for requesting to perform the inquiry to the second device 202 (operation 915) or may perform operation 920 without transmitting the response message.

In operation 920, the first device 201 may transmit an ID packet including a GIAC to the third device 203. For example, the first device 201 may multicast or broadcast the ID packet every specified period (e.g., two times per one time slot).

In response to receiving the ID packet from the first device 201, in operation 925, the third device 203 may transmit an FHS packet including a DAC of the third device 203 to the first device 201. The first device 201 may receive the FHS packet transmitted from the third device 203.

In operation 930, the first device 201 may transmit an inquiry result report message to the second device 202 over a first link (e.g., a link 210-1 of FIG. 2). According to an embodiment, the first device 201 may transmit the FHS packet of the third device 203, which is received in operation 925, together with the inquiry result report message to the second device 202.

Figure 10:
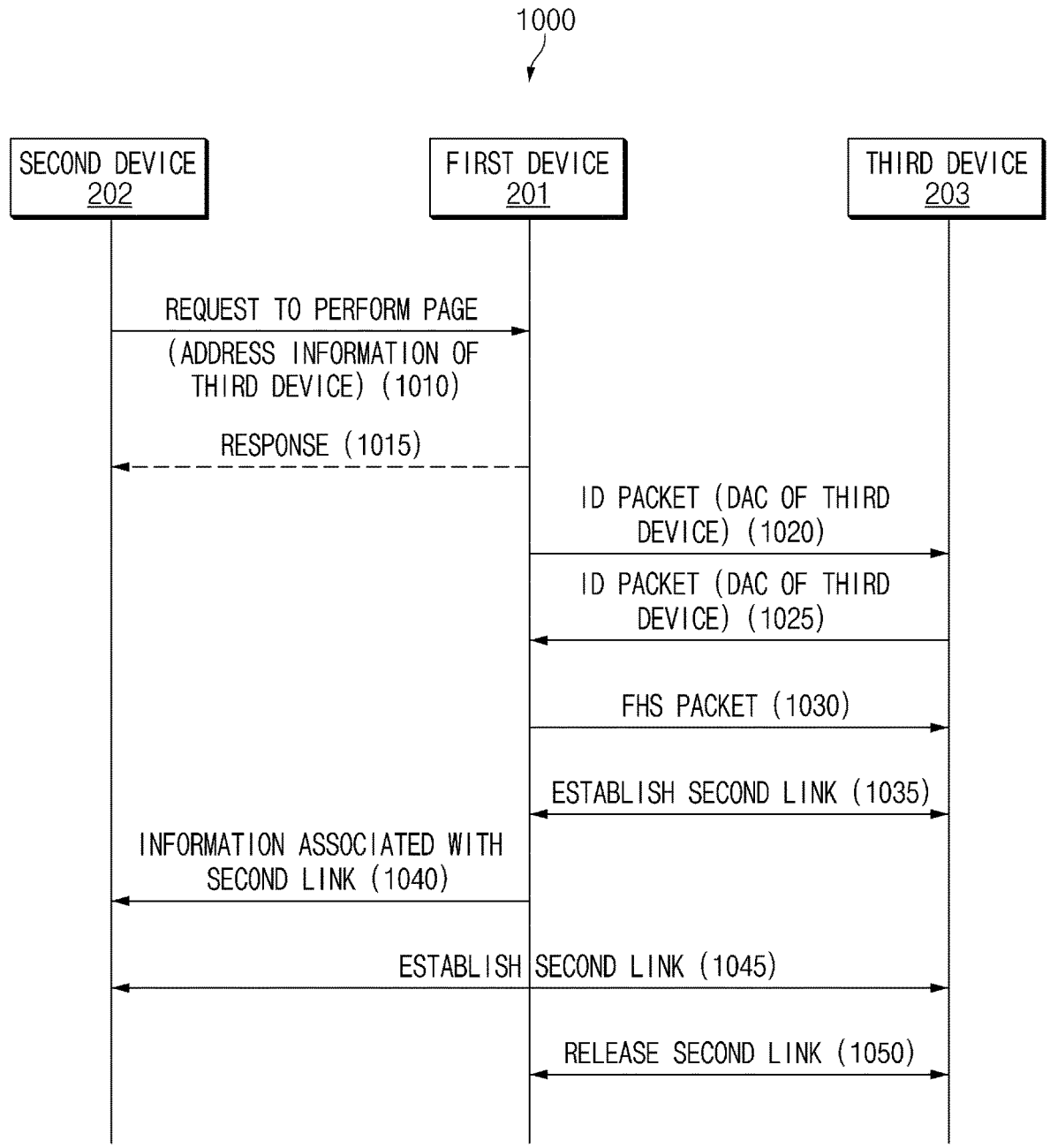
FIG. 10 illustrates a signal sequence diagram for performing a page according to an embodiment of the disclosure.

FIG. 10 illustrates a signal sequence diagram 1000 for performing a page according to an embodiment of the disclosure.

Operations 1010 to 1050 may be performed after the operations of the signal sequence diagram 900 of FIG. 9.

Referring to FIG. 10, in operation 1010, a second device 202 may transmit a message for requesting to perform a page to a first device 201 over a first link (e.g., a link 210-1 of FIG. 2). According to an embodiment, the second device 202 may insert address information (e.g., BD_ADDR) or a DAC of a third device 203 into the message. According to an embodiment, the second device 202 may transmit an FHS packet of the second device 202 together with the message. According to an embodiment, the second device 202 may further insert the information included in Table 1 above into the message. For another example, when the first device 201 and the second device 202 are composed of a set, the second device 202 may fail to perform operation 1010. The first device 201 may transmit a response message for responding to receiving the message for requesting to perform the page to the second device 202 (operation 1015) or may perform operation 1020 without transmitting the response message.

In operation 1020, the first device 201 may transmit an ID packet including a DAC of the third device 203 to the third device 203. In response to receiving the ID packet, in operation 1025, the third device 203 may transmit the ID packet including the DAC of the third device 203 to the first device 201.

In operation 1030, the first device 201 may transmit the FHS packet of the second device 202 to the third device 203. In operation 1035, the first device 201 may establish a second link with the third device 203. For example, the first device 201 may establish the second link according to the Bluetooth protocol specification based on at least one of an FHS packet, a BD_ADDR, a DAC, or an EIR packet of the second device 202.

In operation 1040, the first device 201 may transmit information associated with the second link (e.g., a link 210-2 of FIG. 2) to the second device 202. The information associated with the second link may include at least one of, for example, Bluetooth address information, piconet clock information, logical transport (LT) address information, used channel map information, link key information, service discovery protocol (SDP) information, an FHS packet, an EIR packet, and/or supported feature information.

In operation 1045, the second device 202 may establish the second link with the third device 203 based on the information associated with the second link and the Bluetooth protocol specification. In operation 1050, the first device 201 may release the second link between the first device 201 and the third device 203. For another example, the first device 201 may fail to release the second link.

Although not illustrated in FIG. 10, according to other embodiments, the first device 201 may only receive the ID packet in place of the second device 202. For example, when the ID packet is received in operation 1025, the first device 201 may transmit a signal for notifying the second device 202 that the ID packet is received to the second device 202. In this case, the first device 201 may fail to perform operations 1030 to 1040. The second device 202 may transmit the FHS packet to the third device 203, and may establish the second link with the third device 203 in operation 1045.

Figure 11:
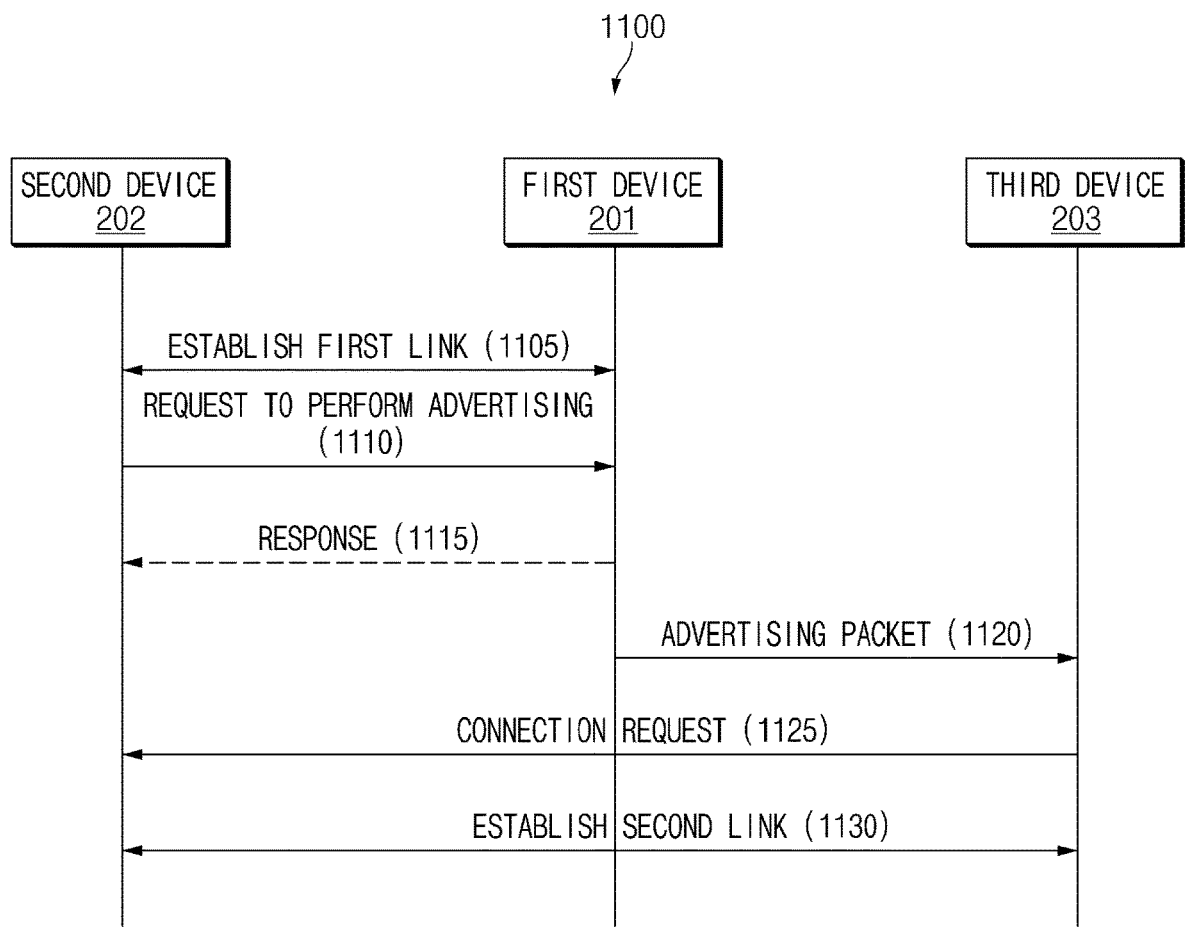
FIG. 11 illustrates a signal sequence diagram for performing advertising according to an embodiment of the disclosure.

FIG. 11 illustrates a signal sequence diagram 1100 for performing advertising according to an embodiment of the disclosure.

Referring to FIG. 11, in operation 1105 (e.g., operation 405 of FIG. 4), a first device 201 may establish a first link (e.g., a link 210-1 of FIG. 2) based on a Bluetooth protocol with a second device 202.

In operation 1110, the second device 202 may transmit a message for requesting to perform advertising to the first device 201. According to an embodiment, the second device 202 may insert at least one of manufacturer information, a device name, or an access address of the second device 202 into the message. According to an embodiment, the second device 202 may further insert the information included in Table 1 above into the message. For another example, when the first device 201 and the second device 202 are composed of a set, the second device 202 may fail to perform operation 1110. The first device 201 may transmit a response message for responding to receiving the message for requesting to perform the advertising to the second device 202 (operation 1115) or may perform operation 1120 without transmitting the response message.

In operation 1120, the first device 201 may transmit an advertising packet including at least one of manufacturer information, a device name, or an access address of the second device 202 to the third device 203.

In response to receiving the advertising packet, in operation 1125, the third device 203 may transmit a connection request message including the access address of the second device 202 to the second device 202. When the second device 202 receives the connection request message, a second link between the second device 202 and the third device 203 may be established (operation 1130).

Figure 12:
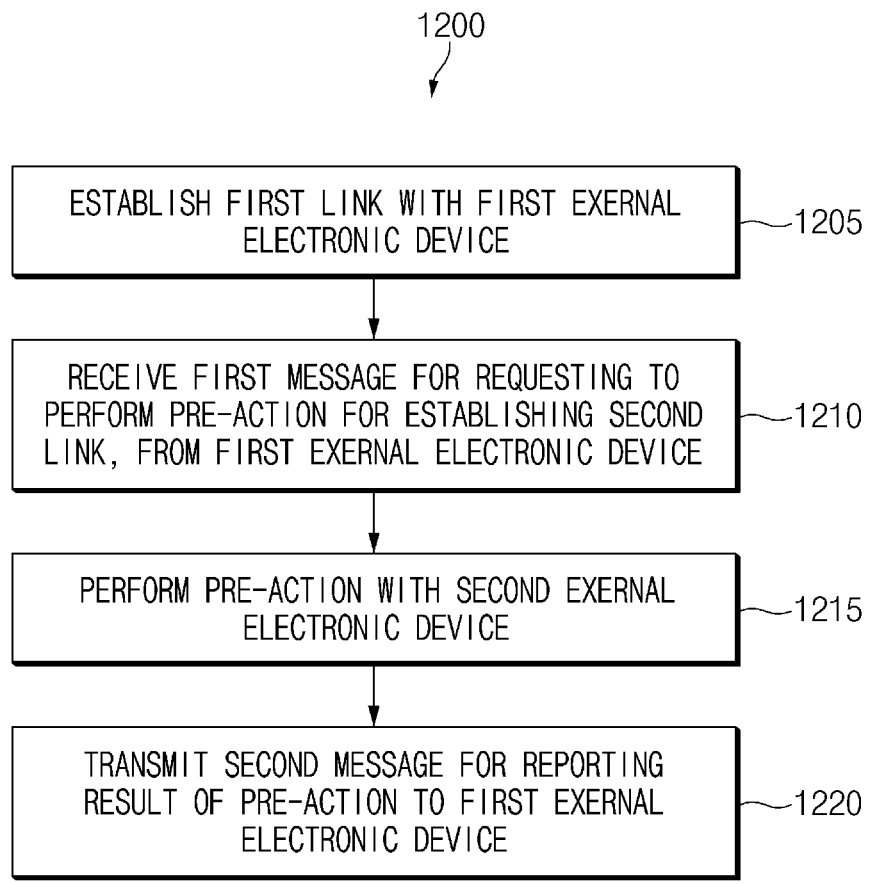
FIG. 12 illustrates an operational flowchart of an electronic device for taking a pre-action according to an embodiment of the disclosure.

FIG. 12 illustrates an operational flowchart 1200 of an electronic device (e.g., a first device 201 of FIG. 2) for taking a pre-action according to an embodiment of the disclosure.

Operations of the operational flowchart described below may be performed by an electronic device or a component (e.g., a processor 120 or a wireless communication module 192 of FIG. 1) included in the electronic device.

Referring to FIG. 12, in operation 1205, the electronic device may establish a first link (e.g., a link 210-1 of FIG. 2) based on a Bluetooth protocol with a first external electronic device (e.g., a second device 202 of FIG. 4).

In operation 1210, the electronic device may receive a first message for requesting to take a pre-action for establishing a second link from the first external electronic device. The second link may refer to a link between the first external electronic device and a second external electronic device (e.g., a third device 203 of FIG. 4).

According to various embodiments, the electronic device may perform operation 1215 in response to receiving the first message or may perform operation 1215 based on whether a specified condition for taking a pre-action is satisfied. An embodiment of considering the specified condition will be described with reference to FIG. 13.

In operation 1215, the electronic device may take a pre-action with the second external electronic device. For example, the electronic device may perform at least one of an inquiry scan, a page scan, a BLE scan, a BLE initiating scan, an inquiry, a page, or advertising based on information received from the first external electronic device in place of the first external electronic device.

In operation 1220, the electronic device may transmit a second message for reporting a result of the pre-action to the first external electronic device.

Figure 13:
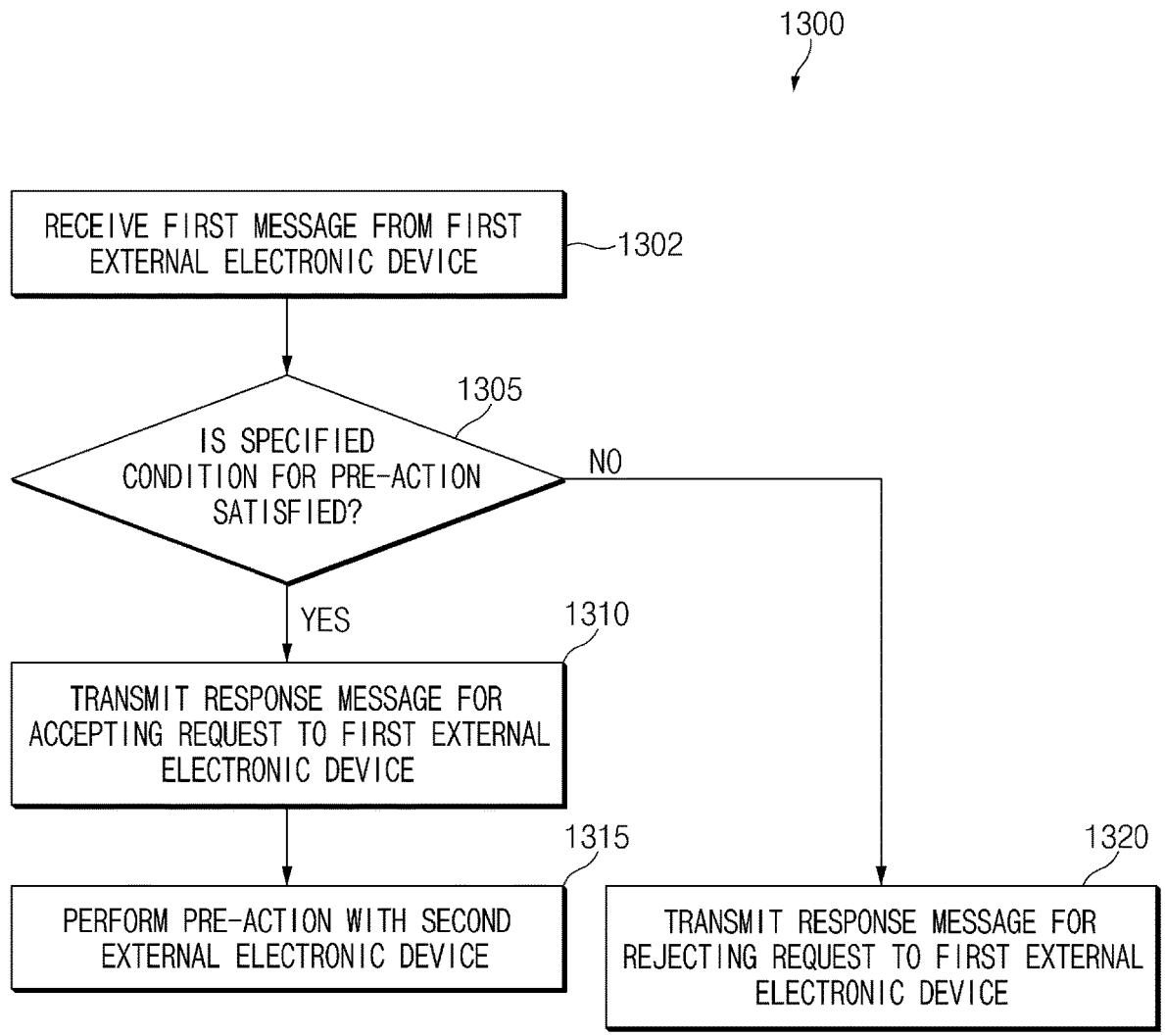
FIG. 13 illustrates another operational flowchart of an electronic device for taking a pre-action according to an embodiment of the disclosure.

FIG. 13 illustrates another operational flowchart 1300 of an electronic device (e.g., a first device 201 of FIG. 2) for taking a pre-action according to an embodiment of the disclosure.

Referring to FIG. 13, in operation 1302 (e.g., operation 1210 of FIG. 12), the electronic device may receive a first message from a first external electronic device (e.g., a second device 202 of FIG. 4).

In operation 1305, the electronic device may determine whether a specified condition for a pre-action is satisfied, in response to receiving the first message. According to an embodiment, the electronic device may determine whether the specified condition is satisfied, based on at least one of information of the first external electronic device or information of the electronic device. The information of the first external electronic device may include at least one of, for example, the information included in Table 1 above, a type of the first external electronic device, or a capability of the first external electronic device. The information of the electronic device may include at least one of, for example, a battery level of the electronic device, battery remaining capacity of the electronic device, current consumption required for a pre-action, antenna resource information of the electronic device, a type of the electronic device, a capability of the electronic device, or a surrounding wireless communication state of the electronic device. For example, when the remaining capacity of the battery of the electronic device is greater than the remaining capacity of the battery of the first external electronic device, when current consumption of the electronic device is less than current consumption of the first external electronic device with respect to the same pre-action, or when an antenna resource of the first external electronic device is insufficient, the electronic device may determine that the specified condition is satisfied.

According to an embodiment, the information of the first external electronic device may be obtained in a process of establishing a first link in FIG. 12 or may be obtained through the first message.

When the specified condition is satisfied ('YES' of operation 1305), in operation 1310, the electronic device may transmit a response message for accepting a request to the first external electronic device. In operation 1315 (e.g., operation 1215 of FIG. 12), the electronic device may take a pre-action with a second external electronic device.

When the specified condition is not satisfied ('NO' of operation 1305), in operation 1320, the electronic device may transmit a response message for rejecting the request to the first external electronic device. For example, when a battery level or battery remaining capacity of the electronic device is less than a specified value, when current consumption required for a pre-action of the first external electronic device is greater than the specified value, or when at least one of antenna resource information, a type, a capability, or a surrounding wireless communication state of the electronic device is not satisfied, the electronic device may transmit the response message for rejecting the request to the first external electronic device.

Figure 14:
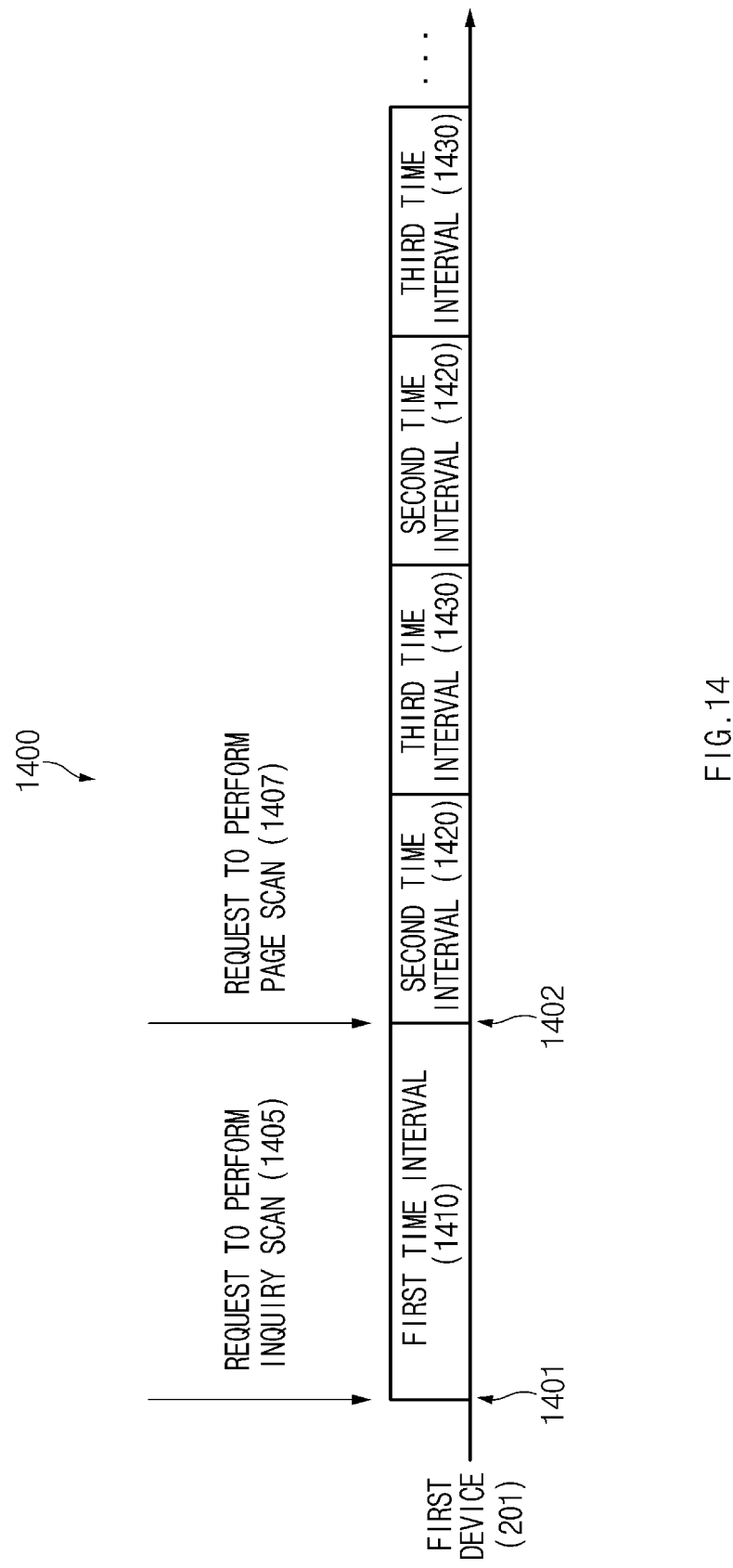
FIG. 14 illustrates a graph for describing an operation of controlling a duty according to an embodiment of the disclosure.

FIG. 14 illustrates graph 1400 for describing an operation of controlling a duty according to an embodiment of the disclosure.

Referring to FIG. 14, the horizontal axis of graph 1400 may represent a duty cycle according to the flow of time. Hereinafter, a number (e.g., '100' or '50') used for describing a duty cycle only refer to a relative value of the duty cycle operated by a first device 201 and is not limited and interpreted as an absolute numeric value. It may be assumed that a maximum value of a duty capable of being operated by the first device 201 is 100.

The first device 201 according to various embodiments may control a duty for taking a pre-action depending on a state of a resource available to the first device 201. For example, when an external electronic device connected with the first device 201 based on a Bluetooth protocol is only a second device 202 and when the first device 201 is requested to perform an inquiry scan from the second device 202 while not performing another operation based on the Bluetooth protocol, the first device 201 may perform the inquiry scan using a duty of 100 (e.g., a first time interval 1410) from a first timing 1401 requested to perform the inquiry scan. When the first device 201 is requested to perform a page scan from the second device 202 while performing the inquiry scan, it may divide a duty for the inquiry scan and a duty for the page scan at a certain rate (e.g., 50:50) from a second timing 1402 requested to perform the page scan. For example, the first time interval 1410 may be divided into a second time interval 1420 and a third time interval 1430, each of which has the same length. For another example, although not illustrated in FIG. 14, the first device 201 may be requested to perform an inquiry scan from the second device 202 in a state where it is connected with another external electronic device to use a call service. The first device 201 may use a duty of 50 (e.g., the second time interval 1420) to use a call service and may use a duty of 50 (e.g., the third time interval 1430) to perform an inquiry scan. In this case, when the call service is ended, the first device 201 may perform an inquiry scan using a duty of 100 (e.g., the first time interval 1410).

According to other embodiments, the assignment of a duty for a pre-action may be determined by a user input or may be determined in advance by the first device 201 and the second device 202 while a first link (e.g., a link 210-1 of FIG. 2) is established.

Figure 15:
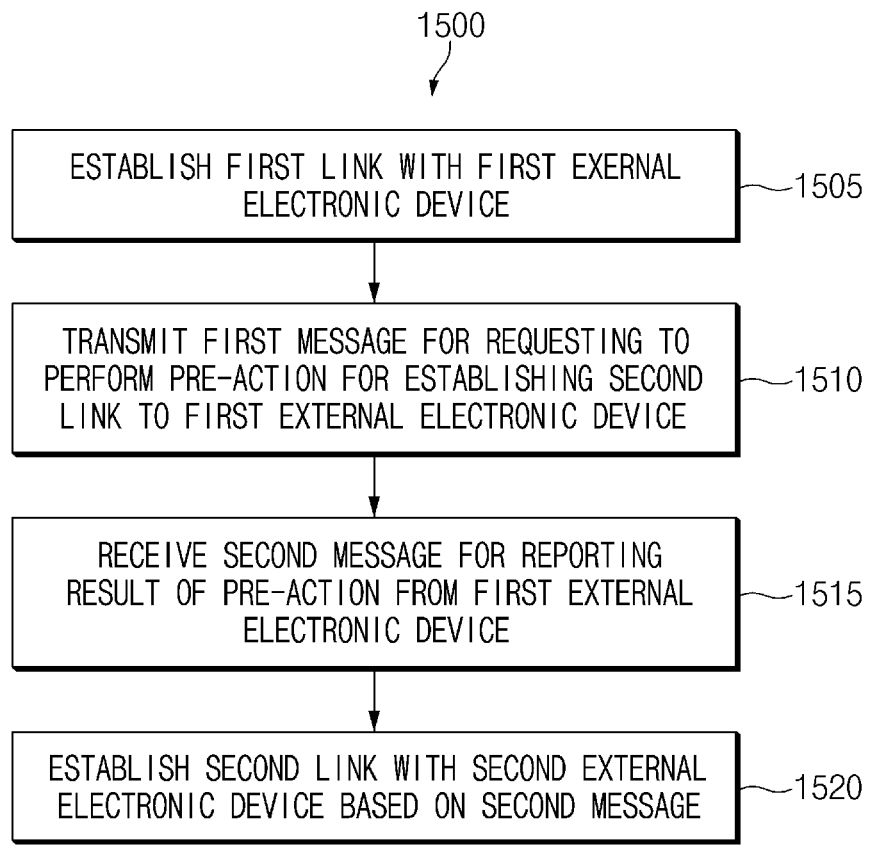
FIG. 15 illustrates an operational flowchart of an electronic device for requesting to take a pre-action according to an embodiment of the disclosure.

FIG. 15 illustrates an operational flowchart 1500 of an electronic device (e.g., a second device 202 of FIG. 4) for requesting to take a pre-action according to an embodiment of the disclosure.

Referring to FIG. 15, in operation 1505, the electronic device may establish a first link based on a Bluetooth protocol with a first external electronic device (e.g., a first device 201 of FIG. 2). According to an embodiment, while establishing the first link with the first external electronic device, the electronic device may determine whether it is possible for the first external electronic device to take a pre-action in place of the electronic device, based on information received from the first external electronic device.

In operation 1510, the electronic device may transmit a first message for requesting to take a pre-action for establishing a second link to the first external electronic device. The second link may refer to, for example, a link between the electronic device and the second external device (e.g., a third device 203 of FIG. 4).

In operation 1515, the electronic device may receive a second message for reporting a result of the pre-action from the first external electronic device. For example, the electronic device may receive the second message indicating that an inquiry, an inquiry scan, BLE advertising, a BLE scan, a page, or a BLE initiating scan is completed from the first external electronic device. According to an embodiment, the second message may include information (e.g., at least one of an ID packet, an FHS packet, an EIR packet, address information of the second external electronic device, or a DAC) obtained through the pre-action by the first external electronic device.

In operation 1520, the electronic device may establish the second link with the second external electronic device based at least in part on the second message. For example, when the second message includes the information, the electronic device may establish the second link with the second external electronic device based on the information included in the second message and the Bluetooth protocol specification.

Figure 16:
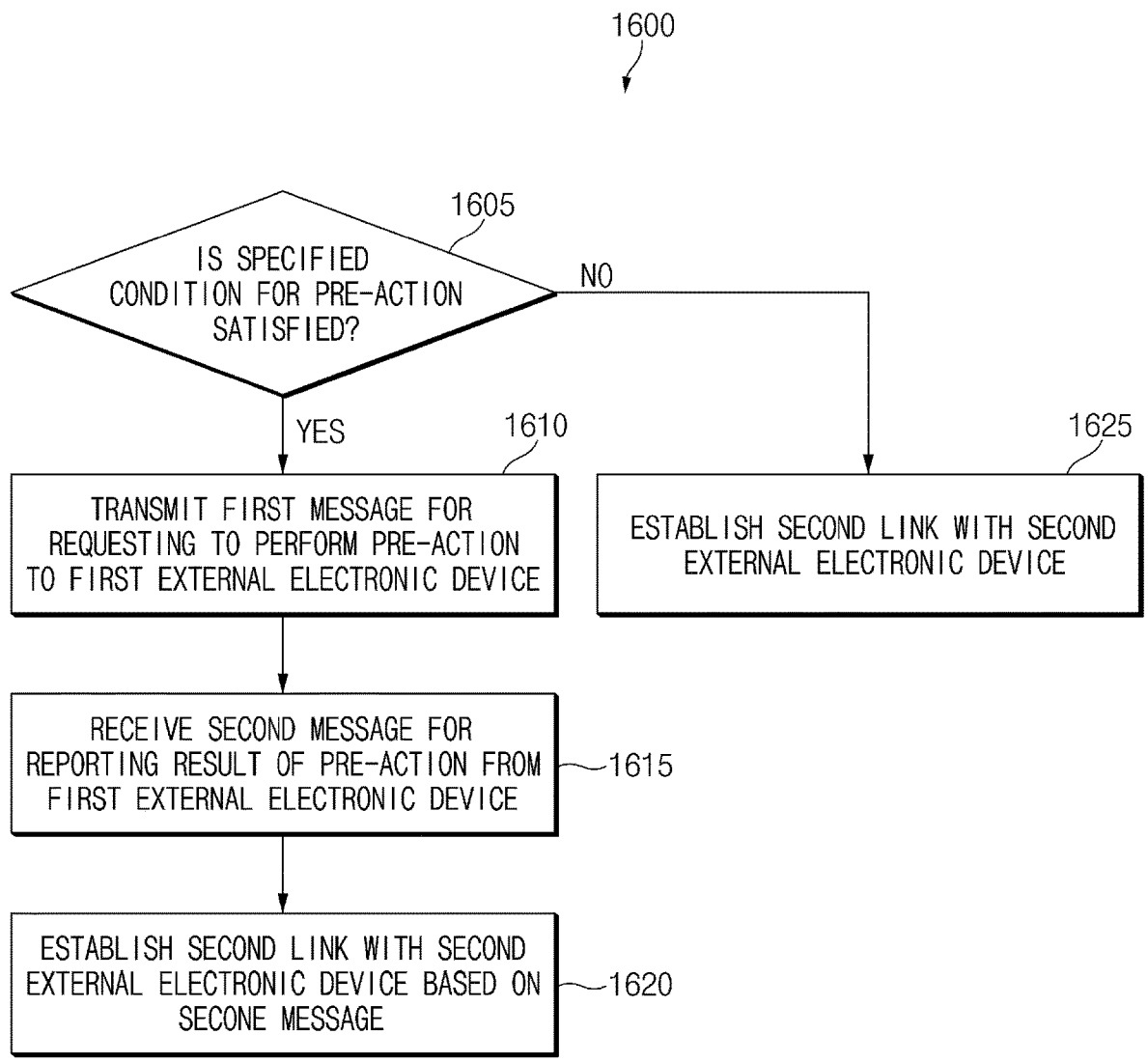
FIG. 16 illustrates another operational flowchart of an electronic device for requesting to take a pre-action according to an embodiment of the disclosure.

FIG. 16 illustrates another operational flowchart 1600 of an electronic device (e.g., a second device 202 of FIG. 4) for requesting to take a pre-action according to an embodiment of the disclosure.

According to various embodiments, the electronic device may request a first external electronic device (e.g., a first device 201 of FIG. 4) to take a pre-action based on whether a specified condition for the pre-action is satisfied or may directly establish a second link with a second external electronic device.

Referring to FIG. 16, in operation 1605, the electronic device may determine whether the specified condition for the pre-action is satisfied. According to an embodiment, the electronic device may determine whether the specified condition is satisfied, based on at least one of the information included in Table 1 above, a type of the electronic device, or a capability of the electronic device. For example, when the remaining capacity of the battery of the electronic device is less than a threshold, when power consumption of the electronic device for a pre-action is greater than or equal to the threshold, or when an antenna resource of the electronic device is less than the threshold, the electronic device may determine that the specified condition is satisfied.

When the specified condition is satisfied ('YES' of operation 1605), in operation 1610, the electronic device may transmit a first message for requesting to take a pre-action to a first external electronic device. In operation 1615, the electronic device may receive a second message for reporting a result of the pre-action from the first external electronic device. In operation 1620, the electronic device may establish a second link with a second external electronic device based on a second message.

When the specified condition is not satisfied ('NO' of operation 1605), in operation 1625, the electronic device may establish the second link with the second external electronic device without intervention of the first external electronic device.

Figure 17:
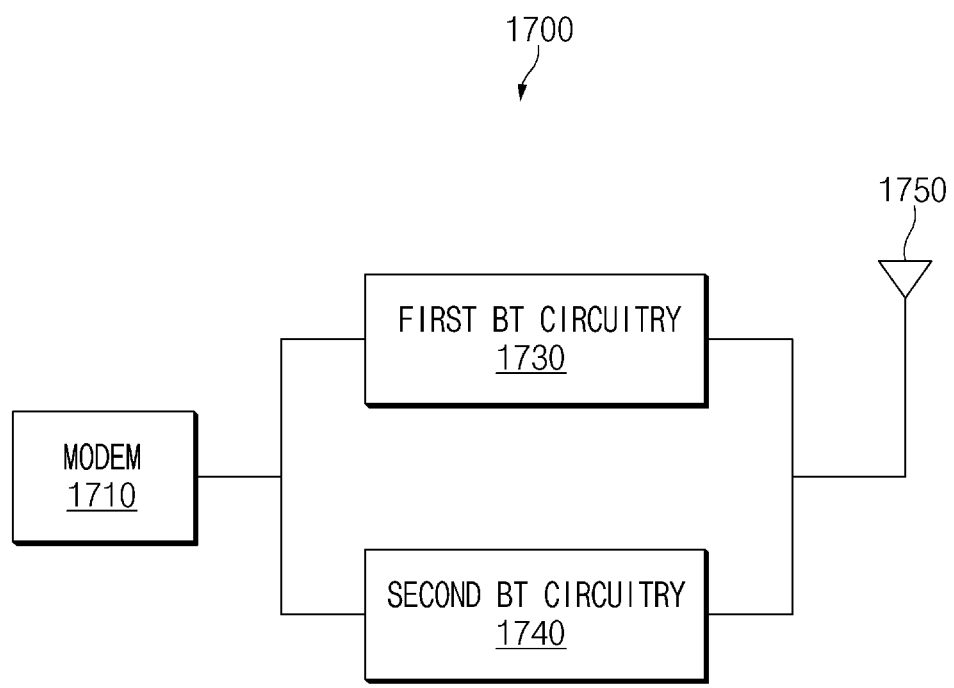
FIG. 17 illustrates a block diagram about some components of an electronic device according to an embodiment of the disclosure.

FIG. 17 illustrates a block diagram 1700 about some components of a first device 201 according to an embodiment of the disclosure.

Referring to FIG. 17, a first device 201 may include a modem 1710 (e.g., a communication processor (CP)) for processing a baseband signal, at least one antenna 1750

(e.g., a part of an antenna module 197 of FIG. 1), and a plurality of Bluetooth (BT) circuitries 1730 and 1740 configured to be operatively connected with the modem 1710 and the at least one antenna 1750 and support a BT protocol. According to various embodiments, the first BT circuitry 1730 and the second BT circuitry 1740 may be separate components or may be included in one module.

According to an embodiment, the first BT circuitry 1730 and the second BT circuitry 1740 may differ in performance and current consumption from each other. For example, the first BT circuitry 1730 may provide performance (e.g., a data throughput) higher than the second BT circuitry 1740, whereas the second BT circuitry 1740 may have smaller current consumption than the first BT circuitry 1730.

The first device 201 according to various embodiments may selectively use the plurality of BT circuitries 1730 and 1740. For example, the first device 201 may take a pre-action for establishing a link using the second BT circuitry 1740 and may perform data communication over the link using the first BT circuitry 1730.

According to an embodiment, the first BT circuitry 1730 may receive at least one of a BD_ADDR, a DAC, a frequency hop synchronization (FHS) packet, an extended inquiry response (EIR) packet, or filter information of the second BT circuitry 1740 and at least one of a BD_ADDR or a DAC of a target (e.g., a third device 203-1) for taking a pre-action from the second BT circuitry 1740 to take the pre-action.

Through the above-mentioned structural feature, the electronic device 101 may reduce current consumption required to take a pre-action.

As described above, an electronic device (e.g., a first device 201 of FIG. 4) according to various embodiments may include a wireless communication circuitry (e.g., at least a part of a wireless communication module 192 of FIG. 1) configured to support a Bluetooth protocol and at least one processor (e.g., a processor 120 of FIG. 1) operatively connected with the wireless communication circuitry. The at least one processor may be configured to establish a first link based on the Bluetooth protocol with a first external electronic device (e.g., a second device 202 of FIG. 4) using the wireless communication circuitry, receive a first message for requesting to take a first pre-action for establishing a second link between the first external electronic device and a second external electronic device (e.g., a third device 203 of FIG. 4) from the first external electronic device, using the wireless communication circuitry, take the first pre-action for establishing the second link with the second external electronic device using the wireless communication circuitry, and transmit a second message for reporting a result of the first pre-action to the first external electronic device using the wireless communication circuitry.

According to an embodiment, the at least one processor may be configured to identify whether a specified condition for taking the first pre-action is satisfied, based at least in part on information of the first external electronic device, the information being included in the first message or being obtained from the first external electronic device while establishing the first link, transmit a response message for accepting the request to take the first pre-action using the wireless communication circuitry, when the specified condition is satisfied, and take the first pre-action with the second external electronic device.

According to an embodiment, the at least one processor may be configured to identify that the specified condition is satisfied, when a battery level of the first external electronic device is less than a threshold, when battery remaining capacity of the first external electronic device is less than the threshold, when current consumed in the first external electronic device for the first pre-action is greater than or equal to the threshold, when an antenna resource of the first external electronic device is less than the threshold, when a type of the first external electronic device is a specified type, when battery remaining capacity or a battery level of the first external electronic device is less than battery remaining capacity or a battery level of the electronic device, when current consumption of the first external electronic device is greater than current consumption of the electronic device with respect to the same pre-action, or when at least two or more of the conditions are satisfied.

According to an embodiment, the wireless communication circuitry may include a first Bluetooth (BT) circuitry (e.g., a first BT circuitry 1730 of FIG. 17) and a second BT circuitry (e.g., a second BT circuitry 1740 of FIG. 17) with smaller current consumption than the first BT circuitry. The at least one processor may be configured to take the first-pre-action using the second BT circuitry.

According to an embodiment, the first pre-action may include an inquiry scan based on a Bluetooth legacy protocol. The at least one processor may be configured to receive an identification (ID) packet including a general inquiry access code (GIAC) from the second external electronic device, using the wireless communication circuitry, and transmit a frequency hop synchronization (FHS) packet and/or an extended inquiry response (EIR) packet of the first external electronic device, the FHS packet and/or the EIR packet being included in the first message or being obtained from the first external electronic device while establishing the first link, to the second external electronic device in response to the ID packet.

According to an embodiment, the first pre-action may include a page scan based on a Bluetooth legacy protocol. The at least one processor may be configured to receive an ID packet including a device access code (DAC) of the first external electronic device from the second external electronic device, using the wireless communication circuitry, transmit the ID packet including the DAC of the first external electronic device to the second external electronic device in response to the ID packet, receive an FHS packet of the second external electronic device from the second external electronic device, and transmit the second message for reporting a result of the page scan to the first external electronic device.

According to an embodiment, the first pre-action may include a Bluetooth low energy (BLE) scan based on a BLE protocol. The at least one processor may be configured to receive an advertising packet from the second external electronic device, using the wireless communication circuitry, and transmit the second message for notifying the first external electronic device of the reception of the advertising packet to the first external electronic device, when device information of the second external electronic device, the device information being included in the advertising packet, is matched to filter information included in the first message.

According to an embodiment, the at least one processor may be configured to take the first pre-action using a first duty in response to the first message, receive a third message for requesting to take a second pre-action from the first external electronic device while the first pre-action is taken, take the first pre-action using a second duty being a portion of the first duty, in response to the third message, and take the second pre-action using a third duty except for the second duty in the first duty.

As described above, an electronic device (e.g., a second device 202 of FIG. 4) according to various embodiments may include a wireless communication circuitry (e.g., at least a part of a wireless communication module 192 of FIG. 1) configured to support a Bluetooth protocol and a processor (e.g., a processor 120 of FIG. 1) operatively connected with the wireless communication circuitry. The processor may be configured to establish a first link with a first external electronic device (e.g., a first device 201 of FIG. 4), using the wireless communication circuitry, transmit a first message for requesting to take a pre-action for establishing a second link between the electronic device and the second external electronic device (e.g., a second device 202 of FIG. 4) to the first external electronic device, receive a second message for reporting a result of the pre-action from the first external electronic device, and establish the second link with the second external electronic device in response to the second message.

According to an embodiment, the processor may be configured to identify whether a specified condition for the pre-action is satisfied and transmit the first message to the first external electronic device using the wireless communication circuitry, when the specified condition is satisfied.

According to an embodiment, the electronic device may further include a battery. The processor may be configured to identify that the specified condition is satisfied, when a level of the battery of the electronic device is less than a threshold, when remaining capacity of the battery of the electronic device is less than the threshold, when current consumed in the electronic device for the pre-action is greater than or equal to the threshold, when an antenna resource of the electronic device is less than the threshold, when a type of the electronic device is a specified type, or when at least two or more of the conditions are satisfied.

According to an embodiment, the pre-action may include at least one of an inquiry scan, a page scan, a BLE scan, a BLE initiating scan, an inquiry, a page, or advertising.

According to an embodiment, the processor may be configured to transmit or insert at least one of an FHS packet, an EIR packet, filter information, or address information of the second external electronic device together with the first message or into the first message.

As described above, a method of an electronic device (e.g., a first device 201 of FIG. 4) according to various embodiments may include establishing a first link based on a Bluetooth protocol with a first external electronic device (e.g., a second device 202 of FIG. 4), receiving a first message for requesting to take a first pre-action for establishing a second link between the first external electronic device and a second external electronic device (e.g., a third device 203 of FIG. 4) from the first external electronic device, taking the first pre-action for establishing the second link with the second external electronic device, and transmitting a second message for reporting a result of the first pre-action to the first external electronic device.

According to an embodiment, the method may further include identifying whether a specified condition for taking the first pre-action is satisfied, based at least in part on information of the first external electronic device, the information being included in the first message or being obtained from the first external electronic device while establishing the first link and transmitting a response message for accepting the request to take the first pre-action to the first external electronic device, when the specified condition is satisfied.

According to an embodiment, the identifying of whether the specified condition is satisfied may include identifying that the specified condition is satisfied, when a battery level of the first external electronic device is less than a threshold, when battery remaining capacity of the first external electronic device is less than the threshold, when current consumed in the first external electronic device for the first pre-action is greater than or equal to the threshold, when an antenna resource of the first external electronic device is less than the threshold, when a type of the first external electronic device is a specified type, when battery remaining capacity or a battery level of the first external electronic device is less than battery remaining capacity or a battery level of the electronic device, when current consumption of the first external electronic device is greater than current consumption of the electronic device with respect to the same pre-action, or when at least two or more of the conditions are satisfied.

According to an embodiment, the taking of the first pre-action may include receiving an ID packet including a GIAC from the second external electronic device and transmitting an FHS packet and/or an EIR packet of the first external electronic device, the FHS packet and/or the EIR packet being included in the first message or being obtained from the first external electronic device while establishing the first link, to the second external electronic device in response to the ID packet.

According to an embodiment, the taking of the first pre-action may include receiving an ID packet including a DAC of the first external electronic device from the second external electronic device, transmitting the ID packet including the DAC of the first external electronic device to the second external electronic device, in response to the ID packet, and receiving an FHS packet of the second external electronic device from the second external electronic device.

According to an embodiment, the taking of the first pre-action may include receiving an advertising packet from the second external electronic device. The transmitting of the second message may include transmitting the second message to the first external electronic device, when device information of the second external electronic device, the device information being included in the advertising packet, is matched to filter information included in the first message.

According to an embodiment, the taking of the first pre-action may include taking the first pre-action using a first duty in response to the first message. The method may further include receiving a third message for requesting to take a second pre-action from the first external electronic device while the first pre-action is taken, and taking the first pre-action using a second duty being a portion of the first duty, in response to the third message, and taking the second pre-action using a third duty except for the second duty in the first duty.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the electronic device may take a pre-action for establishing a link in a Bluetooth network environment using limited battery capacity and limited resources.

According to various embodiments disclosed in the disclosure, the electronic device may increase a successful rate of a pre-action for establishing a link at the same time of reducing battery consumption or power consumption in a Bluetooth network environment.

According to various embodiments disclosed in the disclosure, the electronic device may guide the user to quickly take pre-actions for connection by taking a pre-action for establishing a link using an external electronic device in a Bluetooth network environment.

In addition, various effects ascertained directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a wireless communication circuitry for supporting a Bluetooth (BT) protocol and a Bluetooth low Energy (BLE) protocol; and
at least one processor operatively connected with the wireless communication circuitry,
wherein the at least one processor is configured to:
establish a first link based on the BT protocol or the BLE protocol with a first external electronic device, using the wireless communication circuitry,
receive a first message for requesting to perform a first pre-action for establishing a second link between the first external electronic device and a second external electronic device from the first external electronic device, using the wireless communication circuitry, wherein the first message comprises at least one of a frequency hop synchronization (FHS) packet, an extended inquiry response (EIR) packet, filter information, or BLE address of the first external electronic device,
perform the first pre-action with the second external electronic device based on the BT protocol or the BLE protocol using the first message and the wireless communication circuitry,
transmit a second message for reporting a result of the first pre-action to the first external electronic device using the wireless communication circuitry, and
maintain the first link with the first external electronic device when the second link is established, wherein the at least one processor is further configured to perform the first pre-action by:
- based on receiving an identification (ID) packet from the second external electronic device, transmitting the FHS packet and the EIR packet of the first external electronic device to the second external electronic device, or
- based on receiving the ID packet from the second external electronic device, transmitting an ID packet including a device access code of the first external electronic device to the second external electronic device.

2. The electronic device of claim 1, wherein the at least one processor is further configured to:
- identify whether a specified condition for taking the first pre-action is satisfied, based at least in part on information of the first external electronic device, the information being included in the first message or being obtained from the first external electronic device while establishing the first link,
- transmit a response message for accepting the request to perform the first pre-action using the wireless communication circuitry, when the specified condition is satisfied, and
- perform the first pre-action with the second external electronic device.

3. The electronic device of claim 2, further comprising:
a battery,
wherein the at least one processor is further configured to identify that the specified condition is satisfied, based on at least one of:
- a battery level of the first external electronic device being less than a threshold,
- a battery remaining capacity of the first external electronic device being less than the threshold,
- current consumed in the first external electronic device for the first pre-action is greater than or equal to the threshold,
- an antenna resource of the first external electronic device is less than the threshold,
- a type of the first external electronic device is a specified type,
- the battery remaining capacity or the battery level of the first external electronic device is less than remaining capacity or a level of the battery of the electronic device,
- current consumption of the first external electronic device is greater than current consumption of the electronic device with respect to a same pre-action, or
- at least two or more of the specified conditions are satisfied.

4. The electronic device of claim 1,
wherein the first link is established based on the BT protocol, and
the first pre-action is performed based on the BLE protocol.

5. The electronic device of claim 1,
wherein the first pre-action includes an inquiry scan based on a Bluetooth legacy protocol, and
wherein the at least one processor is further configured to:
receive an identification (ID) packet including a general inquiry access code (GIAC) from the second external electronic device, using the wireless communication circuitry, and
transmit at least one of the FHS packet or the EIR packet of the first external electronic device, the at least one of the FHS packet or the EIR packet being included in the first message or being obtained from the first external electronic device while establishing the first link, to the second external electronic device in response to the ID packet.

6. The electronic device of claim 1,
wherein the first pre-action includes a page scan based on a Bluetooth legacy protocol, and
wherein the at least one processor is further configured to:
receive an ID packet including a device access code (DAC) of the first external electronic device from the second external electronic device, using the wireless communication circuitry,
transmit the ID packet including the DAC of the first external electronic device to the second external electronic device in response to the ID packet,
receive an FHS packet of the second external electronic device from the second external electronic device, and
transmit the second message for reporting a result of the page scan to the first external electronic device.

7. The electronic device of claim 1,
wherein the first pre-action includes a Bluetooth low energy (BLE) scan based on the BLE protocol, and
wherein the at least one processor is further configured to:
receive an advertising packet from the second external electronic device, using the wireless communication circuitry, and
transmit the second message for notifying the first external electronic device of a reception of the advertising packet to the first external electronic device, when device information of the second external electronic device, the device information being included in the advertising packet, is matched to the filter information included in the first message.

8. The electronic device of claim 1, wherein the at least one processor is further configured to:
perform the first pre-action using a first duty in response to the first message,
receive a third message for requesting to perform a second pre-action from the first external electronic device while the first pre-action is performed, and
perform the first pre-action using a second duty being a portion of the first duty, in response to the third message, and perform the second pre-action using a third duty except for the second duty in the first duty.

9. A method of an electronic device, the method comprising:
establishing a first link based on a Bluetooth (BT) protocol or a Bluetooth low Energy (BLE) protocol with a first external electronic device using a wireless communication circuitry for supporting the BT protocol and the BLE protocol;
receiving a first message over the first link based on the BT protocol for requesting to perform a first pre-action for establishing a second link between the first external electronic device and a second external electronic device from the first external electronic device, wherein the first message comprises at least one of a frequency hop synchronization (FHS) packet, an extended inquiry response (EIR) packet, filter information, or BLE address of the first external electronic device;
performing the first pre-action with the second external electronic device based on the BT protocol or the BLE protocol using the first message;

transmitting a second message for reporting a result of the first pre-action to the first external electronic device; and maintaining the first link with the first external electronic device when the second link is established, wherein the performing the first pre-action comprises;
- based on receiving an identification (ID) packet from the second external electronic device, transmitting the FHS packet and the EIR packet of the first external electronic device to the second external electronic device, or
- based on receiving the ID packet from the second external electronic device, transmitting an ID packet including a device access code of the first external electronic device to the second external electronic device.

10. The method of claim 9, further comprising:
identifying whether a specified condition for taking the first pre-action is satisfied, based at least in part on information of the first external electronic device, the information being included in the first message or being obtained from the first external electronic device while establishing the first link; and
transmitting a response message for accepting the request to perform the first pre-action to the first external electronic device, when the specified condition is satisfied.

11. The method of claim 10, wherein the identifying of whether the specified condition is satisfied includes identifying that the specified condition is satisfied, based on at least one of:
a battery level of the first external electronic device is less than a threshold,
a battery remaining capacity of the first external electronic device is less than the threshold,
current consumed in the first external electronic device for the first pre-action is greater than or equal to the threshold,
an antenna resource of the first external electronic device is less than the threshold,
a type of the first external electronic device is a specified type,
the battery remaining capacity or the battery level of the first external electronic device is less than battery remaining capacity or a battery level of the electronic device,
current consumption of the first external electronic device is greater than current consumption of the electronic device with respect to a same pre-action, or
at least two or more of the specified conditions are satisfied.

12. The method of claim 9, wherein the performing of the first pre-action includes:
receiving an ID packet including a GIAC from the second external electronic device, and
transmitting the FHS packet and/or the EIR packet of the first external electronic device, the FHS packet and/or the EIR packet being included in the first message or being obtained from the first external electronic device while establishing the first link, to the second external electronic device in response to the ID packet.

13. The method of claim 9, wherein the performing of the first pre-action includes:
receiving an ID packet including a DAC of the first external electronic device from the second external electronic device,
transmitting the ID packet including the DAC of the first external electronic device to the second external electronic device, in response to the ID packet, and
receiving an FHS packet of the second external electronic device from the second external electronic device.

14. The method of claim 9,
wherein the performing of the first pre-action includes receiving an advertising packet from the second external electronic device, wherein the transmitting of the second message includes transmitting the second message to the first external electronic device, based on device information of the second external electronic device being matched to filter information included in the first message, and
wherein the device information of the second external electronic device is included in the advertising packet.

15. The method of claim 9,
wherein the performing of the first pre-action includes performing the first pre-action using a first duty in response to the first message, and
wherein the method further comprises:
receiving a third message for requesting to perform a second pre-action from the first external electronic device while the first pre-action is performed, and
performing the first pre-action using a second duty being a portion of the first duty, in response to the third message and taking the second pre-action using a third duty except for the second duty in the first duty.

16. A portable communication device comprising:
a wireless communication circuitry capable of supporting a Bluetooth (BT) protocol and a Bluetooth low energy (BLE) protocol; and
a processor operatively connected with the wireless communication circuitry, wherein the processor is configured to:
establish, using the wireless communication circuitry, a first link with a first external electronic device based on the BT protocol or the BLE protocol;
receive a first message via the first link from the first external electronic device, the first message for requesting the portable communication device to perform a BLE scan based on the BLE protocol instead of the first external electronic device, wherein the first message includes an identification packet and filter information to be used to select one or more external electronic devices including a second external electronic device;
perform, using the wireless communication circuitry, the BLE scan using at least part of the filter information while the first link is maintained between the portable communication device and the first external electronic device, the performing including receiving an advertising packet from the second external electronic device and transmitting an ID packet including an device access code of the first external electronic device to the second external electronic device;
transmit a second message via the first link to the first external electronic device to report a result of the performing of the BLE scan such that a second link is established between the first external electronic device and the second electronic device based at least in part on the result; and
maintain the first link with the first external electronic device at least temporarily while the second link is established.

17. The portable communication device of claim 16, wherein the processor is configured to:

as at least part of the transmitting of the second message, notify the first external electronic device that device information included in the advertising packet received from the second external electronic device corresponds to the filter information included in the first message.

18. The portable communication device of claim 17, wherein the filter information includes supported feature information or manufacturer information, and wherein the processor is configured to:

as part of the performing of the BLE scan, compare the supported feature information or the manufacturer information with a corresponding portion of the device information.

* * * * *